United States Patent [19]

Hoyt et al.

[11] 3,985,719

[45] Oct. 12, 1976

[54] PROCESS FOR THE CONTROLLED ALCOHOLYSIS OF ETHYLENE-VINYL ESTER INTERPOLYMERS

[75] Inventors: John M. Hoyt; Karl Koch; Mathew Williams, Jr., all of Cincinnati, Ohio

[73] Assignee: National Distillers and Chemical Corporation, New York, N.Y.

[22] Filed: June 5, 1975

[21] Appl. No.: 583,943

Related U.S. Application Data

[63] Continuation-in-part of Ser. No. 516,706, Oct. 21, 1974, abandoned, which is a continuation-in-part of Ser. No. 453,242, March 21, 1974, abandoned, which is a continuation of Ser. No. 286,788, Sept. 6, 1972, abandoned.

[52] U.S. Cl. .................................................. 526/10
[51] Int. Cl.$^2$ ................ C08F 210/00; C08F 212/00; C08F 218/00; C08F 220/00
[58] Field of Search .................................. 260/87.3

[56] References Cited
UNITED STATES PATENTS

| | | |
|---|---|---|
| 3,386,978 | 6/1968 | Salyer .............................. 260/87.3 |
| 3,510,463 | 5/1970 | Bristol .............................. 260/87.3 |
| 3,510,464 | 5/1970 | Sato .................................. 260/87.3 |
| 3,523,933 | 8/1970 | Inskip ............................... 260/87.3 |
| 3,560,461 | 2/1971 | Yonezu ............................ 260/87.3 |
| 3,562,234 | 2/1971 | Resz et al. ...................... 260/87.3 |
| 3,692,723 | 9/1972 | Kosagi et al. ................ 260/29.6 E |

Primary Examiner—Joseph L. Schofer
Assistant Examiner—Herbert J. Lilling
Attorney, Agent, or Firm—Kenneth D. Tremain

[57] ABSTRACT

Process for controlling the degree of alcoholysis of ethylene-vinyl acetate and other ethylene-vinyl ester interpolymers, by regulating the initial water content of the materials utilized to make up the reaction medium within predetermined limits in order that partially hydrolyzed polymers may be obtained having substantially constant, predetermined residual vinyl acetate or other vinyl ester contents. The partially hydrolyzed products so prepared have uniform, predetermined properties making them particularly useful in film, adhesive, fluidized bed coating, and like applications.

16 Claims, 5 Drawing Figures

RESIDUAL VINYL ACETATE CONTENTS OF ALCOHOLYZED COPOLYMERS OF EXAMPLE 3 AT DIFFERENT WATER LEVELS

RESIDUAL VINYL ACETATE CONTENTS
OF ALCOHOLYZED COPOLYMERS OF
EXAMPLE 24 AT DIFFERENT WATER LEVELS

PROCESS FOR THE CONTROLLED ALCOHOLYSIS OF ETHYLENE-VINYL ESTER INTERPOLYMERS

PRIOR APPLICATIONS

This application is a continuation-in-part of application Ser. No. 516,706 filed Oct. 21, 1974, now abandoned, which application was a continuation-in-part of application Ser. No. 453,242 filed on Mar. 21, 1974, now abandoned, and which application was, in turn, a continuation of application Ser. No. 286,788 filed on Sept. 6, 1972 and now abandoned.

BACKGROUND OF THE INVENTION

This invention relates to a process for the alcoholysis of ethylene-vinyl ester interpolymers, and more particularly to such a process for controlling the alcoholysis to produce partially hydrolyzed materials having precise, predetermined residual vinyl ester contents.

Processes for hydrolyzing ethylene-vinyl ester interpolymers by alcoholysis in hydrocarbon solvent media, utilizing a wide variety of catalysts, are well known in the art. Such procedures are described, for example, in Roland U.S. Pat. No. 2,386,347, granted Oct. 9, 1945; Sharkey U.S. Pat. No. 2,396,210, granted Mar. 5, 1946; Plambeck U.S. Pat. No. 2,467,774, granted Apr. 19, 1949; Bryant et al U.S. Pat. No. 2,668,809, granted Feb. 9, 1954; Bestian et al U.S. Pat. No. 3,344,129, granted Sept. 26, 1967; Salyer U.S. Pat. No. 3,386,978, granted June 4, 1968; and Bristol U.S. Pat. No. 3,510,463, granted May 5, 1970.

It is recognized in the art that it is difficult to achieve sufficient control over the degree of hydrolysis of ethylene-vinyl ester interpolymers to prepare products of uniform composition. For example, in Roland, U.S. Pat. No. 2,399,653, granted on May 7, 1946, it is disclosed that, in saponification with an alkaline reagent such as an alkali metal hydroxide in solution in a primary alcohol, the hydrolysis is much greater than that which may be accounted for on the basis of reaction of the ester group with the base. Roland sought to overcome this problem and obtain the desired predetermined partial hydrolysis by substantially eliminating the primary alcohol and conducting the reaction in the presence of at least 10% by weight of a secondary or tertiary alcohol incorporating from 3 to 6 carbon atoms. More recently, however, Salyer (U.S. Pat. No. 3,386,978) has disclosed that catalytic hydrolysis of ethylene-vinyl acetate copolymers, for example, can be controlled in the presence of primary alcohols, but that a unique, 1:1:1 mixture of toluene, ethanol, and methanol must be used as the reaction medium for this purpose.

Neither Roland nor Salyer recognized any relationship between reproducibility in the degree of partial hydrolysis of the base resins and the aggregate initial water content of their components, determined prior to combining the components in the reaction zone to form the alcoholysis reaction mixture.

It is also indicated in the art that ethylene-vinyl ester copolymers containing relatively small proportions of the vinyl ester are difficult to hydrolyze because of their poor solubility. Thus, Bestian (U.S. Pat. No. 3,344,129) teaches that such copolymers are hydrolyzed very slowly by alcoholysis in methanol or ethanol as a result of their poor solubility in these solvents. Non-uniform reaction products are said to be obtained therefrom, containing both hydrolyzed and unhydrolyzed molecules. According to Bestian, the previously proposed use of mixtures of aromatic hydrocarbons with alcohols as reaction solvents (Roland U.S. Pat. No. 2,386,347) is only successful in the hydrolysis of those ethylene-vinyl ester polymers in which the molar proportion of vinyl ester to ethylene is greater than 1:5, i.e., in the case of ethylene-vinyl acetate copolymers, copolymers incorporating more than 38% of vinyl acetate by weight. Bestian indicates that when polymers having lower contents of vinyl acetate are hydrolyzed the amount of aromatic hydrocarbon solvent required is quiet high and thus economically disadvantageous, and the speed of reaction is so slow that reaction practically comes to a standstill. To overcome these deficiencies, Bestian suggests the use as reaction solvents of high alcohols having from 4 to 8 carbon atoms, wherein improved solubility may be effected by operating at higher reaction temperatures.

It has also been claimed that small amounts of water in the reaction medium may have deleterious effects on the reaction. British Pat. No. 1,120,189 teaches that, in the alcoholysis of ethylene-vinyl acetate copolymers in the presence of an alkali metal alcoholate catalyst, traces of water cause the catalyst to react with acetic acid ester by-product. To overcome this difficulty it is proposed in the patent to continuously pass an alcohol vapor stream through the reaction zone to sweep out the acetate ester as soon as it is formed. On the other hand, Bristol (U.S. Pat. No. 3,510,463) notes that in the alcoholysis of pelleted ethylene-vinyl ester copolymers, traces of water may be present; this reference does not provide any teaching as to what effect, if any, small amounts of water may have on the reaction.

The alcoholysis of poly(vinyl acetate) itself is carried out in anhydrous methanol containing a maximum of a few percent of water [German Pat. Nos. 642,531 and 763,840]. However, it is also claimed that water has little effect on base-catalyzed alcoholysis of poly(vinyl acetate) [Sakaguchi et at, Kabunshi Kagaku, 20, 286 (1963), cited in "Ethylene and Its Industrial Derivatives", Ernest Benn, Ltd., London, 1969, p. 1025].

When ethylene-vinyl ester copolymers are hydrolyzed by alcoholysis, it is well known to those skilled in the art that the hydrolyzed products are often discolored. Thus, yellow-orange discoloration is very apparent in copolymers which are extensively hydrolyzed in the pelleted form (e.g., as described in the aforesaid Bristol U.S. Pat. No. 3,510,463). Such is confirmed in the noted British Pat. No. 1,120,189 in which it is noted that, unless special measures are taken, product discoloration is encountered in conventional industrial hydrolysis operations when the residual acetyl content is less than 10 mole percent.

It is also claimed in the art that hydrolyzed ethylene-vinyl acetate copolymers are sometimes seriously contaminated with inorganic salts produced from the alkaline alcoholysis catalysts. Salyer (U.S. Pat. No. 3,386,978) teaches that, when hydrolyzed copolymer in an aromatic solvent is recovered by precipitation with an alkanol, the inorganic substances present are not separated but must be removed by extensive washing with water. The relative amounts of inorganic residues left in the hydrolyzed copolymers and the significance of these residues is not indicated.

It is among the objects of the present invention to provide an improved process for the alcoholysis of ethylene-vinyl ester interpolymers resulting in the formation of partially hydrolyzed materials having predetermined, controllable residual vinyl ester contents. The products thus formed may be obtained with good purities, containing low levels of inorganic catalyst residues and being substantially free of discoloration. Other objects and advantages of the process of the present invention will be apparent from consideration of the following detailed description of preferred embodiments thereof.

SUMMARY OF THE INVENTION

Figure 1:
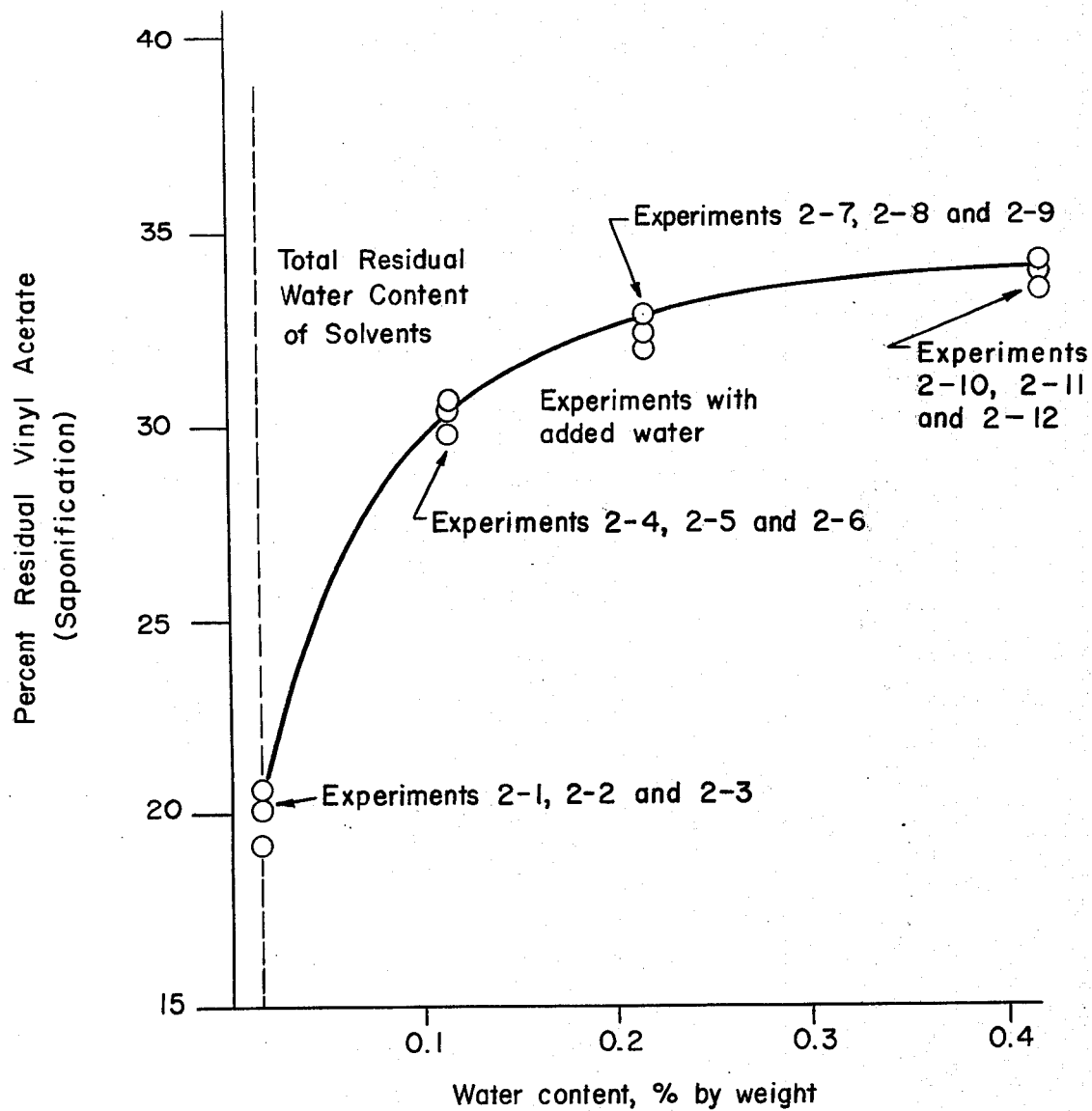
FIGS. 1–5 are graphs illustrating the residual vinyl acetate contents obtained by the alcoholysis of polymers in accordance with various preferred embodiments of the process of the present invention.
Figure 2:
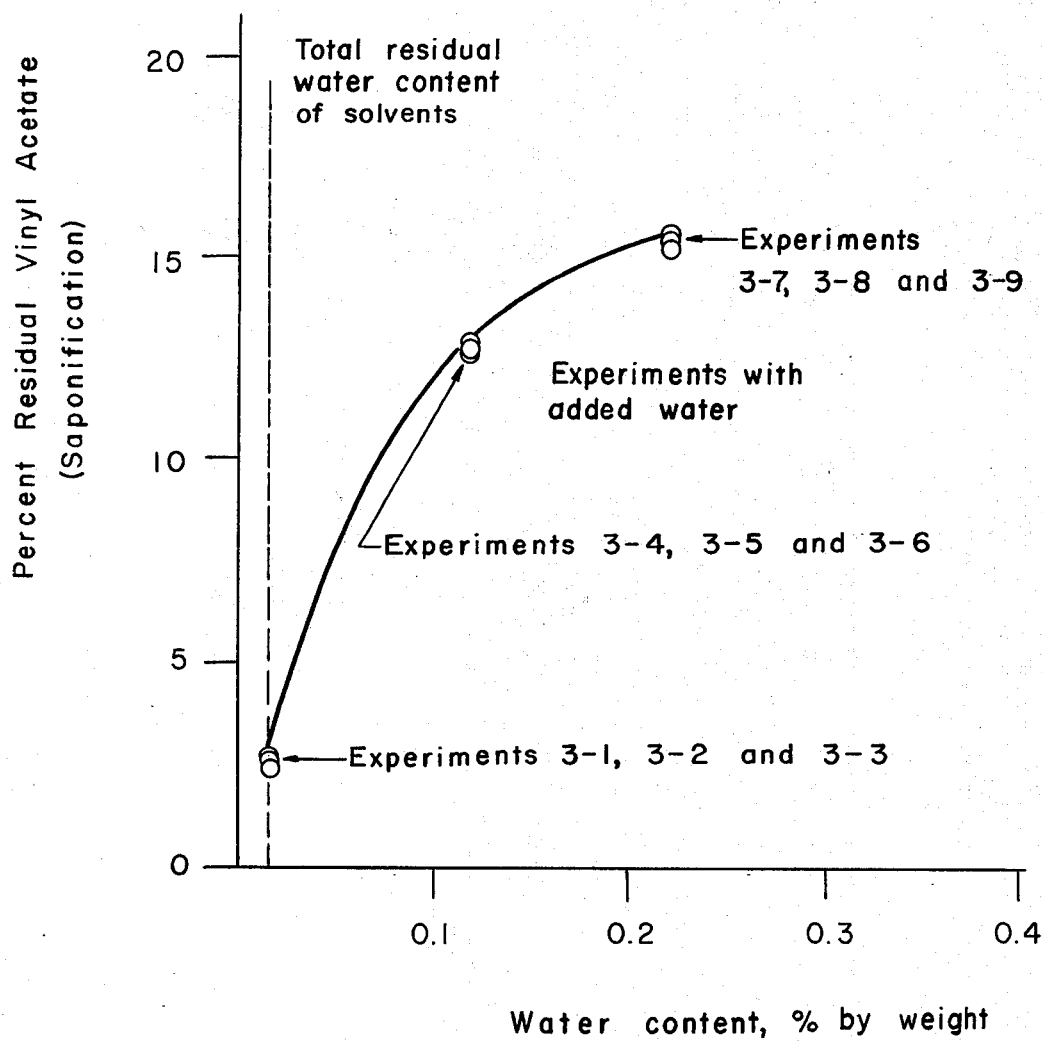

The present invention pertains to a process for the alcoholysis of an ethylene-vinyl ester interpolymer in a reaction medium comprising the polymer, a low-boiling alcohol, any hydrocarbon solvent admixed therein, and an alkaline or acidic catalyst, wherein the aggregate initial water content of the components employed to form the reaction medium is no more than 10% of the weight of the components. In accordance with the invention it has been found that partially hydrolyzed ethylene-vinyl ester interpolymers having predetermined, controllable residual vinyl ester contents may be produced utilizing such a reaction medium when the aggregate initial water content of the aforesaid components of the medium, of any incremental portion of the components introduced during the reaction, and of the components of the media introduced in successive, substantially identical alcoholysis reactions, is so regulated as not to vary by more than about 50%, and preferably by no more than about 20%, by weight of the aforesaid aggregate initial water content of the components of the medium.

Suprisingly, it has been found that by thus controlling the water level of the components of the medium, it is possible to achieve run-to-run reproducibility of the alcoholysis reaction with the formation of partially hydrolyzed polymer products having controllable, substantially uniform degrees of hydrolysis (as measured by the percentage of residual vinyl ester in the polymer), and, hence, properties. This discovery stands in marked contrast to the conflicting disclosures in the prior art respecting the effect of small amounts of water on the saponification or alcoholysis of poly(vinyl acetate) and ethylene-vinyl acetate copolymers. Furthermore, it is most unexpected in the light of prior suggestions that run-to-run reproducibility depends on the particular solvent-alcohol components employed in the reaction medium or on other expedients.

For example, Inskip (U.S. Pat. No. 3,523,933) teaches that the alcoholysis of polyvinyl acetate and vinyl acetate copolymers should be carried out under essentially anhydrous conditions, defined as involving "not more than about 1% water and preferably not more than 0.2% water present in the reaction mixture" (Inskip, column 4, lines 60–69). This teaching thus explicitly refers to water concentrations in the reacting mass during the reaction, after the catalyst has been added, as distinguished from the aggregate initial water content of the components of the reaction medium determined before the reaction, to which the present invention relates.

The water content of the reaction mixture as defined by Inskip is in fact distinct from the aggregate initial water content of the components of the medium determined prior to their admixture, as defined herein. For example, when an alkali metal hydroxide or alkoxide is added to an alcoholic solution, a dynamic equilibrium is set up between these substances, the alcohol and any water present, e.g.,:

$$NaOH + CH_3OH \rightleftharpoons NaOCH_3 + H_2O \qquad (I)$$

[see E. F. Calden and E. Long, J. Chem. Soc., 3737 (1954)].

Evidently the water content of the alkaline alcoholic medium will differ from the initial water content of the alcohol, before introduction of the alkali, by an amount that depends on the equilibrium constant, the amount of alkali added, the amount of alcohol present, etc.

Moreover, during alcoholysis, by-product methyl acetate is produced. Methyl acetate rapidly reacts with sodium hydroxide to form sodium acetate and methanol:

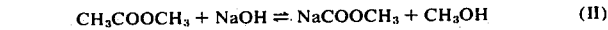

$$CH_3COOCH_3 + NaOH \rightleftharpoons NaCOOCH_3 + CH_3OH \qquad (II)$$

The equilibrium (I) will then shift to the left, causing a corresponding decrease in the water content of the medium during the course of a given alcoholysis reaction.

Hence, the water content of the Inskip reaction mixture is variable, albeit nominally less than the 1% concentration specified. On the other hand, it has been recognized in accordance with the present invention that there is a distinct, reproducible relationahip between the degree of alcoholysis and the absolute aggregate initial water content of the medium components prior to their admixture to produce the alcoholysis reaction medium. Accordingly, while Inskip discloses maintaining the water levels below certain values in the alcoholysis reaction medium, it is disclosed, in accordance with the present invention, that by maintaining specified absolute water contents in the reaction components to be alcoholyzed (and prior to their actual reaction), predetermined and reproducible degrees of alcoholysis may be achieved. Inskip discloses neither this means nor the end achieved thereby.

In accordance with a further feature of the invention, it has been found that in the partial hydrolysis of ethylene-vinyl ester interpolymers containing at least about 20% by weight initial vinyl ester content, it is alternatively possible to maintain the low-boiling alcohol present in the reaction medium at substantially the amount required for stoichiometric alcoholysis, i.e., enough to produce one equivalent of acetate ester of the alcohol for each equivalent of acetate groups to be removed from ethylene-vinyl acetate copolymers, for example. By substantially stoichiometric quantities it is meant that the amount of the low-boiling alcohol should be about 100–150%, and preferably about 100–110% of the molar amount required for stoichiometric alcoholysis of the acetate groups to be converted to hydroxyl moieties. By thus reacting the low-boiling alcohol in substantially stoichiometric amounts, the compositions of the partially hydrolyzed products of polymers having high initial vinyl ester contents are controllable and improved reproducibility is obtained. On the other hand, when the alcohol is added in excess in the manner generally practiced in the art the amount of alcoholysis can easily exceed that desired.

Moreover, it has been found that, employing substantially the stoichiometric amount of alcohol as indicated, the degree of alcoholysis is relatively insensitive to the amount of catalyst in excess of certain threshold catalyst concentrations. Such is not the case when excess alcohol is present in the reaction medium, particularly when interpolymers having high vinyl ester contents are hydrolyzed, in which case changes in catalyst concentration readily effect changes in degree of alcoholysis. It has further been found that the use of substantially stoichiometric amounts of the low-boiling alcohol facilitates improved reaction rates and facilitates separation of reaction by-products; thus, since essentially all the alcohol is consumed in the alcoholysis no azetrope of the alcohol and the ester formed therewith, e.g., methanol-methyl acetate, is formed and the separation of solvent from the by-product ester, e.g., aromatic hydrocarbon from methyl acetate, is simplified.

In accordance with a yet further feature of the present invention, partially hydrolyzed ethylene-vinyl ester polymers, preferably those containing at least about 15% by weight of residual vinyl ester, are recovered by extracting the alcoholysis reaction mixture with water and thereafter steam distilling or directly evaporating the washed hydrocarbon solution of the hydrolyzed resin. The soft and elastomeric product is thus recovered as a crumb, without high levels of inorganic catalyst residues or other contaminants producing discoloration or the like.

Although it is common practice in the art to speak of "fully" hydrolyzed ethylene-vinyl acetate or other ethylene-vinyl ester copolymers, in virtually all cases such polymers contain small amounts of residual vinyl acetate or other vinyl ester detectable by analytical techniques, e.g., by saponification, infra-red spectral analysis, or by pyrolysis and identification of vinyl ester-derived fragments by combined gas-liquid chromatography and mass spectrometry. As used herein, the "partially hydrolyzed" ethylene-vinyl ester interpolymers are intended to include polymers containing as little as about 3% residual vinyl ester and, preferably, from about 10 to 80% thereof.

Partially hydrolyzed ethylene-vinyl ester interpolymers produced as aforesaid and as defined above have uniform degrees of hydrolysis and, as a consequence, posses uniform properties. This makes it possible to produce a wide variety of articles having many useful properties which can be varied widely and in a controllable manner. For example, it is possible to make films in which, in addition to the usual improved strength properties, the amount of gas and vapor transmission may be widely and predictably varied.

Additionally, it is possible to provide partially hydrolyzed products which are of great value in adhesives, wherein control over the relative amounts of hydroxyl groups present is important. In applications involving cross-linking via the hydroxyl groups, the control achieved over hydroxyl content in turn favors controlled density of cross-linking.

Another application for partially hydrolyzed ethylene-vinyl ester interpolymers resides in membrane technology, wherein selectivity of the membrane may be critically dependent on the number of hydroxyl groups present; membranes with consistent properties can most readily be made from resins having controlled hydroxyl contents. Hydrolyzed ethylene-vinyl ester copolymers are also of value in powder coating applications. It is known in the art that particle size is of critical importance in successful powder coating: for example, powder useful in fluidized bed coating will have particle sizes in the range of 20–350 microns. [E. Gemmer, Am. Paint J., 55, No. 48, 81 (1971)]. It is possible to make substantial proportions of powder in these particle sizes, employing relatively more extensively hydrolyzed interpolymers prepared in accordance herewith.

PREFERRED EMBODIMENTS OF THE INVENTION

The present process is applicable to the partial hydrolysis by alcoholysis of interpolymers of ethylene and any vinyl ester. Preferably, such polymers comprise copolymers of ethylene and a vinyl ester such, for example, as vinyl formate, vinyl acetate, vinyl trimethylacetate, vinyl propionate, vinyl trifluoroacetate, or the like. Small amounts of a third monomer may, however, also be contained in the polymer as, for example, sulfur dioxide, a second vinyl ester, carbon monoxide, methyl acrylate, n-butyl acrylate, di-n-butyl maleate, diethyl itaconate, acrylic acid, methacrylic acid, fumaric acid and the like.

Generally, the materials treated as copolymers contain about 0.5 to 95.5, preferably from about 3 to 57, and most desirably from about 3 to 30, mole percent of the vinyl ester, the remainder being ethylene. When a third monomer is present, it may represent as much as about 20% by weight of the total composition, but is preferably incorporated in amounts of the order of 3–10%, the remainder of the composition being constituted of the ethylene and vinyl ester units in the relative proportions indicated hereinabove.

The invention is principally described and illustrated below in connection with the controlled alcoholysis of ethylene-vinyl acetate copolymers. While the reaction of such materials is preferred it should, however, be understood that the process is similarly applicable to the alcoholysis of other ethylene-vinyl ester interpolymers as defined hereinabove.

Ethylene-vinyl acetate copolymers or other materials reacted in the present process may vary in physical form from liquids to solids at room temperature. Generally, they have number average molecular weights which vary broadly from as low as about 1,000 to as high as about 1,000,000. The preferred copolymers vary in molecular weight from about 10,000 to 100,000. Particularly preferred, however, are copolymers which have melt flow rates determined by the ASTM Method D 1238-65T varying from about 0.15 g/10 min. as determined by Condition E to about 25 g/10 min. as determined by Condition A. All melt flow rates hereinafter were determined by Condition E, unless otherwise stated.

When the ethylene-vinyl acetate or like copolymers are alcoholyzed in suspension in the reaction medium described below, the polymers may be in the form of discrete particles or granules which may vary widely in form and size. For example, the copolymers may be pulverulent in nature. Especially preferred are the powders provided by U.S. Pat. No. 3,746,681 which comprise spherical particles having diameters below about 500 microns, with a number-average particle diameter of lss than about 10 microns. The copolymers may also be alcoholyzed in the pelleted form in which the resins are commonly supplied commercially. Generally speaking, the pellets are cubical to ovoid in shape and their largest linear dimensions will range from about 0.5 mm to as much as about 25 mm; however, 2–5 mm pellets are preferred.

The ethylene-vinyl ester copolymers may also be alcoholyzed in the form of sheets and films. The thickness of such films and sheets can be as low as about 0.1 mil and as high as about 500 mils; however, films and sheets in the thickness range of from about 1 mil to 50 mils are preferred. Fibers and strands can also be hydrolyzed. The diameter of such strands can vary from about 0.01 mm to 10 mm with 0.1 mm to 5 mm diameter strands being preferred.

The alcoholysis reaction is carried out in a liquid medium in which the ethylene-vinyl acetate or the like is dispersed, either in suspension or by partial or total dissolution therein. Preferably, the polymer is dissolved in the medium; while some of the alcoholyzed product may come out of solution as the reaction proceeds, in most instances both the original ethylene-vinyl acetate and the partially hydrolyzed product thereof remain substantially dissolved throughout the alcoholysis.

The liquid alcoholysis medium preferably comprises a mixture of a low boiling alcohol employed as the alcoholysis reactant, together with a hydrocarbon solvent admixed therewith. The low boiling alcohol may be any monohydric alcohol having up to 4 carbon atoms, i.e., methanol, ethanol, n-propanol, i-propanol, n-butanol, s-butanol, i-butanol, or t-butanol. Primary alcohols are preferred. The hydrocarbon may be a linear paraffin such as ethane, propane, n-butane, n-pentane, n-hexane, n-heptane, n-octane, n-decane, etc.; a branched paraffin hydrocarbon, for example, 2,2-dimethylbutane, 2,2,4-trimethylpentane, or 2,5-dimethylhexane; a cycloaliphatic hydrocarbon such as methylcyclopentane, cyclohexane, cyclooctane, or decahydronaphthalene; or an aromatic hydrocarbon such as benzene, toluene, xylene-isomer mixtures or the individual isomers thereof, ethylbenzene, cumene, pseudocumene, cymene, diisopropylbenzene, etc. Aromatic hydrocarbons are preferred.

As the vinyl acetate content, for example, of the ethylene-vinyl ester feedstock increases above about 60 weight percent both it and the hydrolyzed ethylene-vinyl acetate produced therefrom become increasingly soluble in the low boiling alcohol constituent, e.g., methanol. Accordingly, the alcoholysis of resins having relatively high vinyl ester content may be carried out in reaction media containing the low-boiling alcohol alone without the addition of a hydrocarbon solvent (or with the addition of only small proportions of the hydrocarbon, depending on the temperature and other reaction conditions). The hydrocarbon solvent may thus be incorporated in the reaction medium in amounts ranging from 0 parts up to as much as 1,000 parts by weight per part of the alcohol therein.

As recognized in the art, any of a variety of alkaline or acidic materials may be utilized as catalysts for the alcoholysis reaction. The preferred catalyst is an alkali metal or alkaline earth metal alkoxide of the low boiling alcohol incorporated in the reaction medium, e.g., lithium methoxide, sodium methoxide, sodium ethoxide, potassium isopropoxide, potassium t-butoxide, magnesium ethoxide, etc. Alternative catalysts comprise the hydroxides of the alkali metal and alkaline earth metals, such as lithium hydroxide, sodium hydroxide, potassium hydroxide, magnesium hydroxide, and calcium hydroxide. Strong mineral and organic acids may also be used as catalysts, including sulfuric acid, hydrochloric acid, hydrofluoric acid, phosphoric acid, and p-toluenesulfonic acid.

In the usual case, the weight ratio of the hydrocarbon and low-boiling alcohol components of the alcoholysis medium may vary broadly from about 1:50 to 1000:1, and preferably from about 1:10 to 100:1, by weight of the hydrocarbon to the low-boiling alcohol. The ratio of the ethylene-vinyl acetate copolymer or other interpolymer reactant to the aforesaid liquid mixture varies from about 1:1000 to 100:1 and is within the range of from 1:10 to 1:1 in the preferred embodiment in which the copolymer reactant and the hydrolyzed product thereof are both substantially in solution. When, however, the ethylene-vinyl ester interpolymer is merely suspended in the medium during the alcoholysis, the ratio of the initial copolymer to the liquid reaction medium may be within the range of from about 1:100 to 5:1 parts by weight.

The catalyst is incorporated in the reaction medium in conventional proportions relative to the ethylene-vinyl acetate or other polymeric material to be hydrolyzed. Employing alkali metal alkoxide or alkali metal hydroxide catalysts, the weight ratio of catalyst to the ethylene-vinyl ester interpolymer varies broadly from about 1:10,000 to about 1:1, ratios within the range of from about 1:1000 to 1:10 being preferred.

As indicated hereinabove, in accordance with the present invention, it has been found that accurate control of the degree of alcoholysis is achieved by regulating the aggregate initial water level of the several medium components introduced in a given reaction run (and in successive runs) in which it is desired to produce substantially the same partially hydrolyzed resin to maintain the aggregate initial water level substantially constant, i.e., within about 50%, and preferably 20% by weight of the aggregate initial water content thereof. Generally, the initial water content may be regulated as aforesaid by controlling the water content of the alcohol and any hydrocarbon solvent charged to the hydrolysis reaction zone in a batch alcoholysis run, or the water content of such streams as may be continuously fed in continuous operations. It should be understood, however, that it is also within the purview of this invention to regulate the initial water content of one or more of the other components of the reaction medium as fed for alcoholysis. Thus, for example, when the water content of the resin to be alcoholyzed is subject to marked variations, such is suitably also regulated in accordance herewith; similar considerations also apply to the catalyst, although the latter is customarily employed in the anhydrous state, with little fluctuation in water content.

Control over the degree of alcoholysis is further insured by carrying out the reaction under conditions designed to prevent the addition or loss of substantial amounts of water to or from the reaction medium. The former objective may be conveniently achieved, for example, by carrying out the reaction under a dry, preferably inert gaseous blanket.

The particular process parameters necessary to produce any specified partially hydrolyzed copolymer depend, of course, upon the concentration of the copolymer in the reaction medium, the composition of the medium, the nature and concentration of catalyst, temperature, and reaction time, as well as the total initial water content of the alcohol, and any hydrocarbon solvent comprising the reaction medium. Ordinarily, the degree of alcoholysis is most conveniently adjusted by suitable variations in catalyst, catalyst concentration, and reaction time.

Once the conditions necessary to produce a desired degree of alcoholysis or hydrolysis of a given ethylene-vinyl ester copolymer have been determined, and whatever the aggregate initial water levels may be, we have found that good reproducibility is readily achieved throughout the alcoholysis reaction or in successive, substantially identical runs by maintaining the aggregate initial water content of the medium components, e.g., of the solvent and alcohol components thereof, at substantially the same level throughout the run or runs, the water levels of the individual components being determined and controlled before their admixture in the reaction zone.

The total initial water content of the alcohol and hydrocarbon solvent which may be used to prepare the reaction medium may be as low as 1 ppm or as high as 10% by weight thereof. In accordance herewith it has been found that the presence of any given minor amount of total water in the alcohol and hydrocarbon used as the reaction medium is less deleterious to good run-to-run reproducibility in producing successive batches of a given hydrolyzed ethylene-vinyl acetate copolymer than are excessive run-to-run variations in the water content.

The degree of control over the water content of the medium components which is necessary in continuous operation or in successive batch runs is somewhat less critical at higher total water levels than at the lower levels. This may be appreciated by inspection of the general shape of the curves in FIGS. 1–5, which relate degree of alcoholysis to the aggregate water content of the individual medium components, under otherwise identical conditions. The same shape of curve is observed irrespective of whether sodium hydroxide or sodium methoxide is employed to produce the hydrolyzed product.

Specification of the permissible variation in run-to-run water levels is dependent upon the extent of the variations which can be tolerated in the degree of alcoholysis of the product, e.g., if in the alcoholysis of the ethylene-vinyl acetate copolymer originally containing about 40 weight percent vinyl acetate, illustrated in FIG. 1, it is desired to produce successive products containing 25 ± 1% residual vinyl acetate, the water level should be held between 320 and 480 ppm, i.e., at a midpoint of 400 ppm, ± 20%. Still better control could obviously be achieved by holding the water within even narrower limits. On the other hand, if the residual vinyl acetate of the product were to be held at 32 ± 2%, the water level could be between 1000 and 3400 ppm, or 2200 ppm ± 55%.

Figure 4:
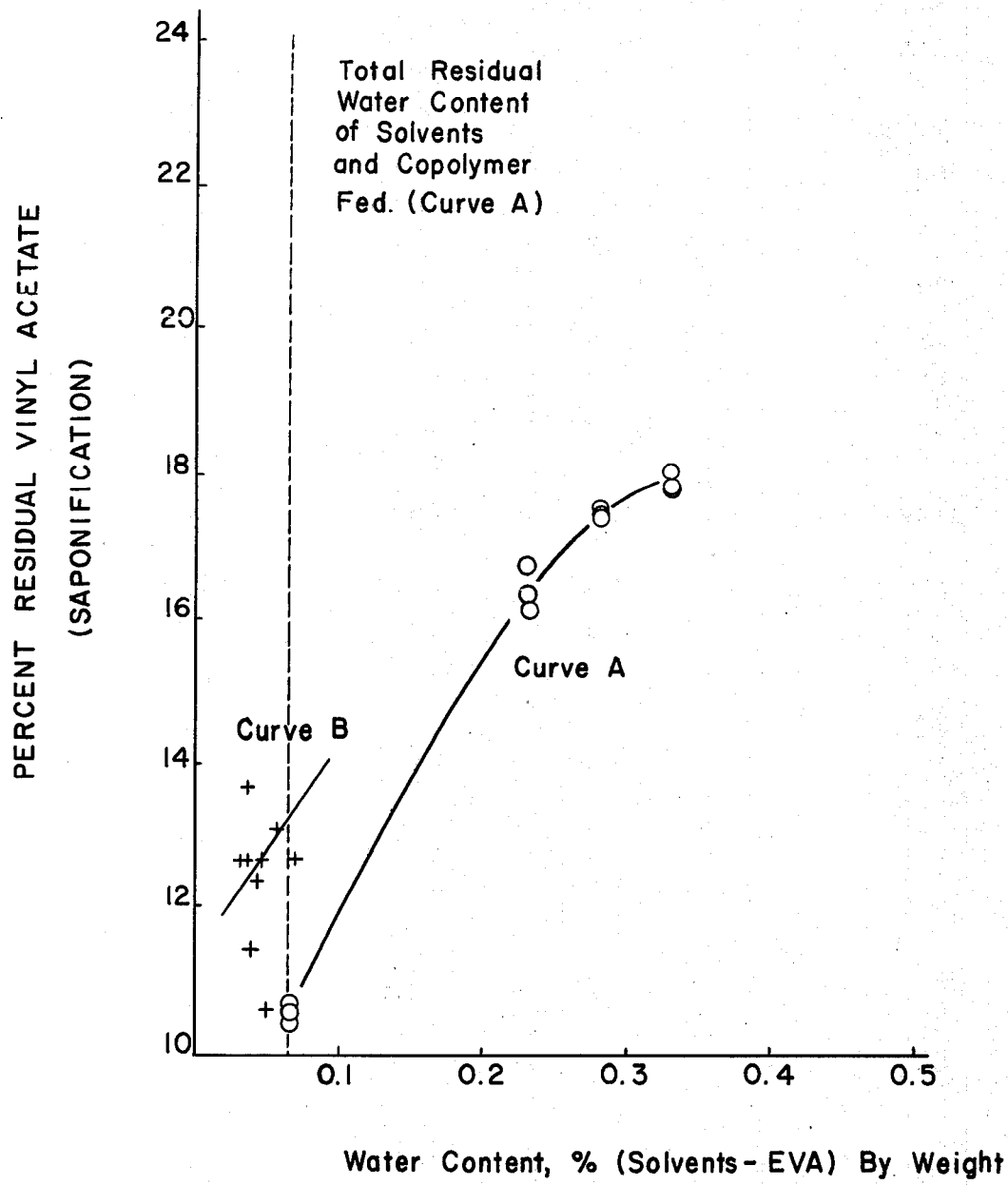
Figure 5:
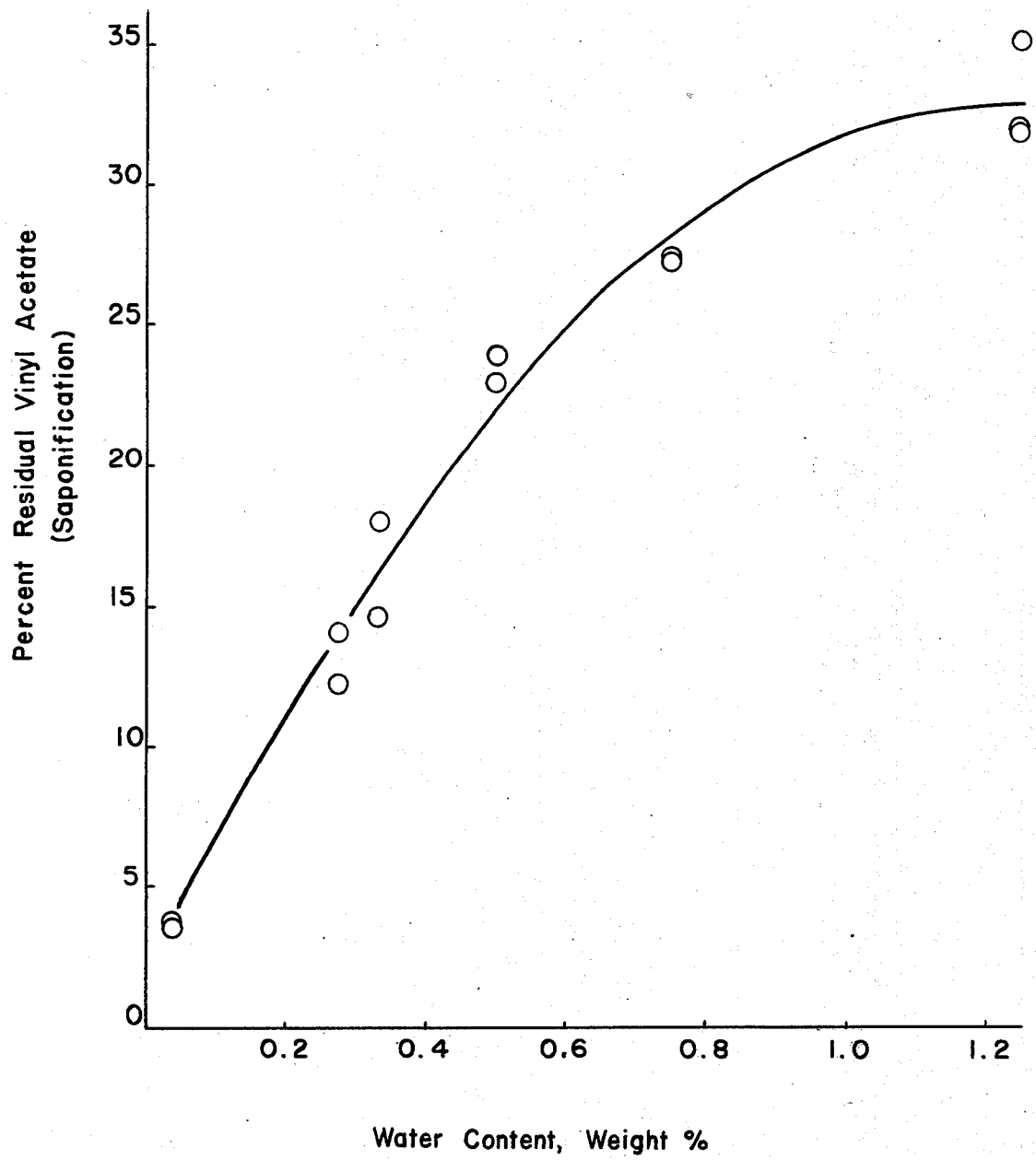

If it is desired to alcoholyze a copolymer containing about 28 weight percent vinyl acetate to a product containing 12.5 ± weight percent residual vinyl acetate, employing sodium methoxide as the catalyst (FIG. 2), the water level should be maintained between 740 and 1540 ppm or at 1140 ppm ± 35%; when, however, sodium hydroxide is used as catalyst to produce the same 12.5 ± 2% residual vinyl acetate content from an ethylene-vinyl acetate copolymer originally containing about 28% vinyl acetate, it may be seen from FIG. 4, Curve A, that the water content may vary over a somewhat wider range, i.e., from about 650 ppm to about 1700 ppm or 1150 ppm ± 48%. However, if it were desired to hold the residual vinyl acetate level in successive products at 15 ± 1% with sodium hydroxide and as catalyst, the corresponding water levels would have to be between 1550 and 2150 ppm or 1850 ppm ± 16%.

Figure 3:
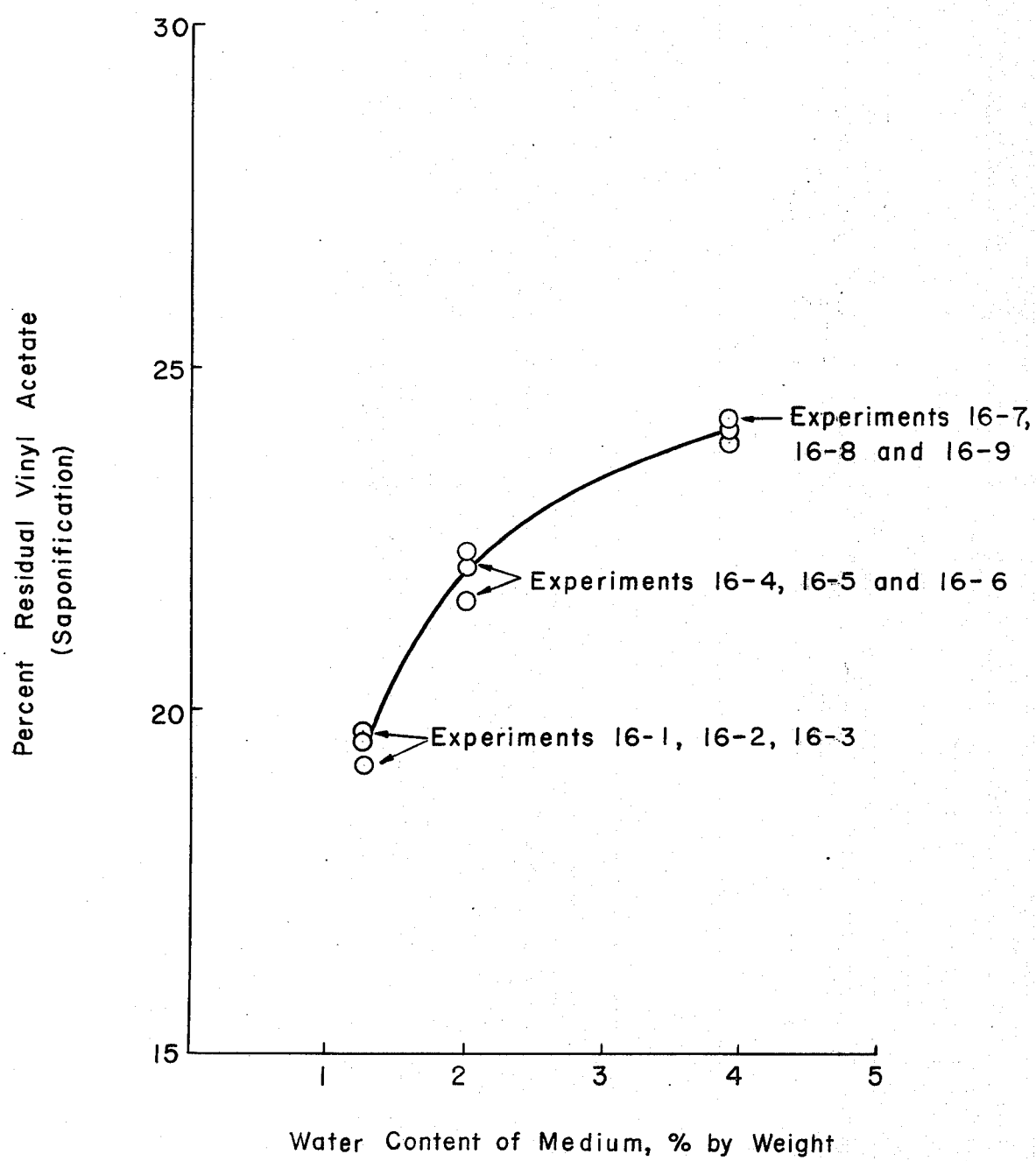

FIG. 3 illustrates the fact that even at water levels above 1%, i.e., 1.25–4% water, the same close dependence of degree of hydrolysis on constancy of water level also exists, making it clear that it is not the absolute water level which is important in controlling reproducibility of partial alcoholysis, but surprisingly, rather the constancy of water level. In the case of the relatively high water levels of Example 16 (and FIG. 3), it is likely that the hydrolyzed product may be formed by two mechanisms, i.e., catalytic alcoholysis and saponification, a reaction stoichiometric with alkali. It is particularly surprising that the same close dependence of degree of hydrolysis is observed under these transitional conditions.

The relatively high water levels shown in FIG. 3 and Example 16 require correspondingly higher catalyst levels and ordinarily are not preferred. An additional objection to relatively high water levels is that water decreases the solubility of the resin in the medium, until evidence of incipient precipitation (cloudiness, milkiness) is observed. Such separation or precipitation of the resin may be disadvantageous from the materials handling point of view, since it could ultimately lead to plugging of the process equipment. For these reasons it is preferred to establish and maintain water levels of up to about 5% (and most desirably from about 0.005% to 0.5%) in the reaction media employed in the practice of the present invention.

To control the water levels of the alcohol and hydrocarbon solvent components, each liquid feed stream may be dried before use by passage through suitable solid disiccant such, for example, as activated molecular sieves, or activated alumina or silica gels. The drying is conducted under anhydrous conditions, i.e., under a protective atmosphere of a dry, inert gas, such as nitrogen, argon or helium, having a water content below about 1000 ppm, preferably below about 300 ppm.

The alcoholysis reaction may be carried out at temperatures varying broadly within the range of from about 0° to 250° C, temperatues of from about 30° to 100° C being, however, preferred. The reaction may be carried out at atmospheric pressure or, alternatively, under applied pressures of up to about 5000 psi. It is sufficient if the ambient pressure is adequate to maintain the reaction medium in the liquid state at the particular reaction temperature chosen. Reaction times may also be broadly varied; thus, the alcoholysis may be carried out for periods of from about one second to 24 hours, preferably from about 0.05 to 10 hours.

In carrying out the process in the preferred embodiment, an ethylene-vinyl acetate copolymer or the like is first dissolved in the hydrocarbon solvent by agitating and heating the two in admixture at a temperature somewhat in excess of the reaction temperature to be used, but preferably below the boiling point of the hydrocarbon solvent. When the ethylene-vinyl acetate copolymer is substantially dissolved, the temperature of the resulting solution is adjusted to the vicinity of the boiling point of the low-boiling alcohol to be used for alcoholysis.

To the copolymer solution there is next added with agitation a solution of the catalyst in the low-boiling alcohol or in a mixture of the alcohol and the hydrocarbon solvent which may be employed in the alcoholysis medium. Utilizing the preferred alkali metal or alkaline earth metal alkoxide catalyst, such may be added directly to the catalyst solvent under anhydrous conditions or, alternatively, may be generated in situ by adding the required amount of alkali metal or alkaline earth metal to the low-boiling alcohol or low-boiling alcohol-containing mixture under an anhydrous, inert atmosphere and allowing sufficient time to elapse for all of the metal to dissolve therein. The catalyst solution, however prepared, may vary widely in catalyst content up to saturation, catalyst concentrations of from about 0.01 to 10% being preferred.

When stoichiometric amounts of alcohol are used to accomplish equivalent amounts of alcoholysis, it is preferred that the catalyst be added in a mixture of the stoichiometric amount of alcohol and enough of the hydrocarbon solvent to prevent separation of hydrolyzed polymer in the reaction mixture as the catalyst solution is added. In such solution the stoichiometric alcohol will amount to about 1 to 80% of the catalyst solvent, the remainder the solvent being hydrocarbons, and the catalyst itself will range from about 0.01 to 10% by weight of the solution. Utilizing methanol and sodium methoxide, for example, as the alcohol and catalyst components of such solutions, the use of alcohol:catalyst molar ratios of from about 50:1 to 1:1, preferably from about 20:1 to 5:1, is suitable.

The catalyst solution may be added to the hydrocarbon solution of the ethylene-vinyl ester copolymer at a rate which can vary from almost instantaneous addition, as in the use of stoichiometric amounts of alcohol, to gradual addition extending over the entire reaction period. It is generally preferred to add the catalyst solution over a period which will comprise from about ½ to 1/10 of the total reaction time, commencing with the addition of the catalyst solution. The catalyst solution is added at temperatures broadly corresponding to the limits of the reaction temperature, 0° to 250° C, but it is preferred that the catalyst solution be added in the vicinity of the reflux temperature of the reaction medium, i.e., from about 10° C below reflux to the reflux temperature.

The alcoholysis reaction is carried out under conditions of agitation, temperature and pressure which are essentially similar to those which prevail during the catalyst addition, although it is possible to carry out the catalyst addition and the subsequent reaction operation under different conditions of agitation, temperature and pressure.

The by-product acetate or other derived ester of the low-boiling alcohol used for the alcoholysis reaction can be removed as the alcoholysis reaction progresses, as previously proposed in the art; preferably, however, the ester is permitted to accumulate as the reaction proceeds.

When the alcoholysis reaction is carried out with the copolymers in the solid phase, merely suspended in the medium, it is usually desirable to prevent coalescence or agglomeration of the individual particles of suspended polymer, so that the hydrolyzed product particles have the same shape as the original ethylene-vinyl ester copolymer. This can be achieved by control of such factors as the ratio of solvent components in the reaction medium, and by regulation of the reaction temperature, in particular the reaction temperature in the initial stages of the reaction. These factors can best be adjusted and established by empirical experimentation and will be different for different copolymers. For example, when pellets of ethylene-vinyl acetate copolymers containing from about 10 to 50 weight percent vinyl acetate are hydrolyzed in the solid phase, a reaction mixture containing up to about 75%, preferably about 10–55%, of the hydrocarbon solvent (the balance methanol or other low-boiling alcohol) is most conveniently utilized.

The degree of alcoholysis obtained may be determined empirically, or by instantaneous analysis of the hydrolyzed copolymer or of the accumulated acetate or other ester by-product of the low-boiling alcohol, as the reaction proceeds. The methyl acetate present in the alcoholysis reaction mixture (after destroying the catalyst with acetic acid, for example) can be determined quantitatively by gas-liquid chromatography, e.g., in a ½ inch by 6 foot column filled with 100–120 mesh "Chromosorb 102" packing. The amount of by-product methyl acetate can be related to the residual vinyl acetate content of the polymer isolated at the same time interval as the methyl acetate sample. The gas-liquid chromatography analysis can be accomplished in 5–10 minutes, which permits following the progress of the alcoholysis at time intervals which approach instantaneous analysis conditions. The extent of the hydrolysis may thus be controlled by making incremental additions of catalyst or methanol (in stoichiometric alcoholysis) until gas-liquid chromatography analysis of the reaction mixture indicates the desired degree of hydrolysis has been reached, whereupon the reaction is suitably terminated.

Termination of the reaction is effected, at a point corresponding to any desired degree of hydrolysis, by addition of a substance capable of destroying the catalyst. When the catalyst is an alkali metal alkoxide or hydroxide, for example, this is accomplished by the addition of a weak acid which is not itself a catalyst for the alcoholysis, for example, acetic acid. The weak acid is added in an amount stoichiometrically equivalent to the catalyst, or in moderate excess thereof; suitably, the amount of acetic acid so utilized may range from about 1 to 50 moles per mole of catalyst, preferably from about 1–1.5 moles per mole of catalyst.

The catalyst quenching agent is preferably added neat; alternatively, it may be added in solution in the low-boiling alcohol of alcoholysis, in particular in the low-boiling alcohol thereafter employed to precipitate or crumb the hydrolyzed ethylene-vinyl ester copolymer.

After terminating the alcoholysis reaction as aforesaid, the hydrolyzed polymeric product is recovered. If the original polymer has been extensively hydrolyzed, i.e., if it contains less than about 25% residual vinyl acetate, it is generally preferable to precipitate it as a finely divided powder by adding a sufficient amount of the low-boiling alcohol used in the alcoholysis. The alcohol added to effect the precipitation may be used in amounts of from about 0.1 to 5 volumes, preferably from about 0.5 to 2 volumes, per volume of the reaction mixture. The alcohol is preferably gradually added to the alcoholysis product, generally over a period lasting from about 1/10 to the entire term of the reaction.

The alcohol precipitant may be added at any temperature in the 0°–250° C reaction temperature range; it is, however, preferred to add the alcohol at about the reflux temperature of the final alcoholysis reaction mixture, i.e., at a temperature between 10° C below the reflux temperature and the reflux temperature itself. Addition at lower temperatures often leads to the precipitation of the hydrolyzed product in a gelatinous mass which cannot conveniently be removed from the reactor. Additionally, such gelatinous products are difficult to filter and to wash whereas, if the precipitation is carried out at, or in the vicinity of the reflux temperature, the hydrolyzed product is recovered as a finely divided solid which forms an easily-transferred slurry in the mother liquor, and is readily and rapidly filtered and washed.

The finely comminuted, hydrolyzed ethylene-vinyl acetate copolymers thus recovered are preferably washed first with additional low-boiling alcohol and then with water or with mixtures of low-boiling alcohol and water. Alternatively, it is possible to accomplish the washing of the finely comminuted product by continuous extraction with a relatively small amount of the low-boiling alcohol.

The mother liquid from the product recovery operation is combined with low-boiling alcohol used in washing the product for distillation for solvent recovery and recycle. If the acetate ester of the low-boiling alcohol used in the alcoholysis is removed as an azeotrope during the alcoholysis reaction, the recycle solvents comprise a mixture principally comprising the hydrocarbon solvent and the low-boiling alcohol. By proper selection of the hydrocarbon solvent and the low-boiling alcohol it is possible to arrive at solvent pairs (e.g., xylene and methanol) which differ sufficiently in boiling point to effect an adequate separation by fractional distillation without serious complications because of azeotrope formation. Minor amounts of either alcohol in the hydrocarbon or hydrocarbon in the alcohol fraction present no significant problem, provided the recycle streams are analyzed and their compositions taken into account before re-use.

When the acetate ester of the low-boiling alcohol is not removed during the alcoholysis reaction, it is then often convenient to remove it by distillation from the mother liquor, before the latter is combined with low-boiling alcohol used for precipitation and washing. In any event, the acetate ester is commonly removed as an ester-rich azeotrope with the low-boiling alcohol. The azeotropic mixture may be separated by suitable methods, for example, by extractive distillation with water according to a process known to the art [Revista de Chemie 20, No. 4, 197–8 (1969)]. The acetate ester thus separated may then be hydrolyzed to provide the low-boiling alcohol and acetic acid.

As the vinyl acetate content of the ethylene-vinyl acetate resin to be alcoholyzed increases above about 60%, precipitation wih the low-boiling alcohol per se may not be entirely satisfactory. In such instances it may be desirable to effect product precipitation with a mixture of the alcohol with water (Example 21), with another solvent altogether (Example 22), or when the alcoholysis is carried out in the alcohol alone with solely water (Example 23).

Alternatively, when the hydrolyzed ethylene-vinyl acetate copolymer or other vinyl ester interpolymer produced by the present process is a soft, elastomeric solid, it is convenient to recover the product polymer as a rubbery crumb. Such material cannot be readily recovered by the direct addition of the low-boiling alcohol as a precipitant, in the manner preferred for the production of a finely divided granular product. To the contrary, conventional addition of such an alcohol produces a large, soft plastic mass which is exceedingly difficult to handle, filter and wash and, in particular, to dry.

The crumbing operation for recovery of partially hydrolyzed elastomeric products produced in accordance with the present process is, as noted hereinabove, a further feature of the invention. In accordance therewith, the alcoholysis product mixture is contacted or "phased" with successive portions of water to extract the unreacted low-boiling alcohol, by-product acetate ester of such alcohol, and the catalyst residue from the mixture. From one to ten separate extractions, and preferably, from two to five extractions, are thus utilized. In each extraction the volume of the water employed is within the range of from about 0.2 to 5, and preferably about 0.5 to 2, times the volume of the organic phase extracted.

Following the extraction operation the hydrolyzed polymer is recovered from the remaining hydrocarbon solvent either simply by drying to remove the solvent and water or, preferably, by steam distillation in the presence of a suitable surfactant. Surface active agents so useful comprise non-ionic materials of the ethylene oxide/propylene oxide block copolymer type, in amounts of from about 0.01 to 5%, and preferably from about 0.05 to 0.5%, of the aqueous phase present during the steam distillation. The distillation may be carried out at temperatures of from about 30° to 100° C, the particular temperature being dependent upon the identity of the hydrocarbon solvent and the distillation pressure. Aqueous slurries containing crumb formed in this way are cooled to below about 50° C, and preferably below about 30° C, prior to filtration, in order to prevent agglomeration.

By so conducting the steam distillation there is produced a water suspension of the hydrolyzed copolymer in particulate form with the hydrocarbon being removed as a distillate substantially free of low-boiling alcohol and by-product acetate ester. After drying to remove small amounts of water the hydrocarbon solvent thus separated may be directly recycled for further use in the alcoholysis process.

The noted steam distillation operation differs from those previously proposed wherein the alcoholysis reaction mixture is subjected to conventional steam distillation (see the aforesaid Roland U.S. Pat. No. 2,386,347), or the reaction mixture is gradually added to steaming water (the aforesaid Salyer U.S. Pat. No. 3,386,978). In these cases steam must be used to steam distill the low-boiling alcohol and the acetate ester of the low-boiling alcohol, as well as the hydrocarbon solvent; in the present instance, on the other hand, the alcohol and acetate ester are first separated by extraction with water without the need for steam distillation thereof.

Alternatively, and somewhat less preferably, it is possible to carry out the crumbing operation by contacting the alcoholysis reaction mixture containing the hydrolyzed copolymer with a further quantity of the low-boiling alcohol in a nonturbulent, relatively quiescent state, without the application of agitation. The mixture is permitted to so remain for a brief time interval and is only then mixed. Immediate agitation of such a mixture generally results in precipitation of the hydrolyzed polymeric product as a massive solid which attaches itself to the agitator and cannot thereafter be broken up into particulate form. Delayed agitation, on the other hand, leads to a uniform rubbery crumb which presents no difficulty in removal from the precipitation vessel, in filtration, or in washing.

The following examples further illustrate preferred forms of the alcoholysis process of the present invention. Unless otherwise indicated all parts and percentages appearing in the examples or in the preceding description are given by weight and all temperatures are in degrees Centigrade.

Where the water content of the medium is specified in various of the following examples reference is had to the amount of water present in the hydrocarbon solvent and alcohol employed in the medium plus any water added thereto. The water contents of the resins alcoholyzed in the following experiments are very low and substantially constant, and have been generally ignored (except in Example 20) since the same lot of resin has been used in each of the comparative runs of the respective experiments. Similar considerations apply to the catalyst.

EXAMPLE 1

This example illustrates the partial alcoholysis of an ethylene-vinyl acetate copolymer containing 39.1% vinyl acetate by the process of this invention, wherein the aromatic hydrocarbon solvent is dried prior to use by passage through molecular sieves, the alcoholysis is conducted under nitrogen, and the acetate ester byproduct is allowed to accumulate. The experiments described in this example were carried out by two individual operators and differ somewhat in the relative amount of aromatic hydrocarbon solvent dried by a given amount of molecular sieves, in the fact that the methanol used was reagent grade from different bottles (or drums), both without drying, and in that the sodium methoxide solutions used as catalyst were made up independently, each day just before the experiment.

In each experiment a 5-liter, 3-neck glass reaction flask was equipped with a mechanically-driven paddle stirrer, thermometer, reflux condenser, additional funnel, oil heating bath, and nitrogen inlet. The system was flushed with nitrogen before starting, and a nitrogen atmosphere was maintained in the flask at a small positive pressure (about 2–3 mm. mineral oil) throughout the operations.

Into the flask 1500 ml. of xylene was introduced under nitrogen. The xylene has been dried by passage through a glass column containing Linde 4A molecular sieves activated by heating in an oven at about 200° C. The column used was ⅞ inch O.D. and 18 inches in length. It held about 110 g of molecular sieves. No more than 4 liters of xylene were dried with each charge of molecular sieves, at a throughout rate of about 3 liters/8 hr. day. In some of the experiments no more than 1600–1700 ml. was dried in a 5–6 hr. period. The drying operation was conducted under nitrogen. Before drying, ordinary commercial xylene was found to contain about 200 ppm of water. When one liter of the xylene was passed through the above described drying column, the first 100 ml. to emerge contained 70 ppm water while the ninth 100 ml. increment contained 80 ppm water. Toluene dried by this technique contained 85 ppm water.

Into the dried xylene heated to 65°–70° C was added over ½ hour with stirring 375.0 g of an ethylene-vinyl acetate copolymer containing 39.1% vinyl acetate by saponification and having a melt flow rate of 5.0 g/10 min. (ASTM Method 1238-65T, Condition E). The mixture was heated and stirred 15 minutes longer at 65°–70° C and then cooled to the range of 55°–60° C. There was then added over ½ hour a 54 ml. aliquot of a 0.14 M solution of sodium methoxide (7.5 mM, made by dissolving 0.56 g of metallic sodium in 175 ml. of methanol) diluted with 471 ml. additional methanol. The methanol was not dried before use, but methanol of this grade nominally contains 0.1% of water according to the supplier.

The reaction was continued for an additional 3.5 hours by heating and stirring the mixture at 55°–60° C. At this point the temperature was increased to reflux, and over a period of one hour, 2250 ml. of methanol containing 6.0 ml. of glacial acetic acid (100 mM) was added gradually. After stirring for a further 15 minutes, the slurry was cooled to 30° C.

The polymeric product was isolated by filtration, washed with methanol and water, and dried in vacuum to constant weight at 60° C, a process which required several days. The final product was a rubber.

The above procedure was repeated several times by two different operators (A and B) using the same starting materials and reagents, but with the limitations noted above. The results are shown in Table 1:

TABLE 1

Reproducibility of Partial Alcoholysis of an Ethylene/Vinyl Acetate Copolymer Containing 39.1% Vinyl Acetate

| Exp. No. | Operator | PRODUCT CHARACTERIZATION | | |
|---|---|---|---|---|
| | | Weight Recovered, g | % Residual Vinyl Acetate by Saponification | Melt Flow Rate, g/10 Min. |
| 1-1 | A | — | 23.80 | 13.8 |
| 1-2 | A | 324.8 | 23.81 | 11.2 |
| 1-3 | A | 319 | 24.0, 23.77 | 9.5 |
| 1-4 | A | 332 | 25.88 | — |
| 1-5 | A | 344.4 | 25.17 | — |
| 1-6 | B | — | 23.3 | 9.5 |
| 1-7 | B | 310.9 | 25.05 | 16.8 |
| 1-8 | B | 309.9 | 19.0 | 8.2 |
| 1-9 | B | 309.3 | 18.8, 18.0 | 9.38 |

EXAMPLE 2

This example involves an analysis of the effect of added water on the partial alcoholysis reaction of Example 1.

One feasible technique for isolating rubbery, partially hydrolyzed ethylene-vinyl acetate copolymers is also illustrated, wherein the hydrolyzed copolymer in benzene-methanol solution is cautiously poured into excess methanol and allowed to stand briefly before agitating. Employing this procedure, it is necessary to permit the polymer solution and methanol to stand together undisturbed for a time before seeking to precipitate the resin product in a particulate, crumb form. If the two liquids are stirred at once the resin product invariably separates as a single mass which tenaciously clings to the agitator and does not break up into particulate or crumb form.

In this work benzene was substituted for the xylene of Example 1 to facilitate drying of the final product. A good grade of petroleum derived benzene (Phillips Petroleum Co.) was selected and a portion was placed in a 5-gallon metal can under $N_2$. A 5-gallon can of methanol (U.S. Industrial Chemical Co., drum grade) was similarly employed. According to Karl Fischer Analysis the methanol contained 269–310 ppm water and the benzene contained 57–69 ppm water (see Tables 2 and 3). Neither solvent was dried before use, but both reagent containers were kept closed and under $N_2$.

Triplicate alcoholysis reactions were first carried out in the solvents directly from the supply cans, without added water. Then in a successive set of triplicate runs, 1000 ppm of water was added to the methanol solutions of sodium methoxide catalyst just prior to its addition to the copolymer dissolved in benzene. Similarly, sets of triplicate runs were also made in which 2000 and 4000 ppm was added.

Into a 2-liter, 3-necked glass reaction flask equipped with mechanically-driven paddle-stirrer, thermometer, reflux condenser, addition funnel, oil heating bath, and nitrogen supply was added 500 ml of benzene from the supply can. The benzene was then heated to 75°–80° C, and 125.0 g of the ethylene-vinyl acetate resin of Example 1 (39.1% vinyl acetate) was added over ½ hour. After ½ hour additional stirring to dissolve the resin, the solution was cooled to 55°–60° C and over ½ hour a solution was added made from 130 ml of methanol from the supply can and a 45 ml aliquot of a solution of sodium methoxide prepared by dissolving under $N_2$ 1.223 g of metallic sodium in 875 ml of methanol from the supply can. This sodium methoxide solution was used in all experiments in this example.

The alcoholysis was continued for 3½ hours thereafter at 58°± 1° C, when the reaction was terminated by addition of 0.25 ml of glacial acetic acid. The hydrolyzed product solution was cautiously poured into 1600 ml of cold ordinary methanol in a 5-liter flask equipped with a stirrer. After standing 10 minutes, the contents were agitated vigorously for 5 minutes. The methanol was decanted and 1600 ml more methanol was added. After agitating 5 minutes the methanol was again decanted. The lumpy mass of precipitated product was collected, and dried in vacuum at 60° C overnight.

This procedure was repeated twice and then triplicate experiments were carried out with 1000, 2000 and 4000 ppm of added water. The results are summarized in Table 2, and the substantial uniformity of the vinyl acetate contents of the alcoholyzed polymers produced at each of the specified water levels is plotted in FIG. 1. In each case the precipitated product was a colorless rubbery crumb:

TABLE 2

Alcoholysis of an Ethylene-Vinyl Acetate Copolymer (39.1% Vinyl Acetate) in the Presence of Added Water

| Exp. No. | Amount of Added $H_2O$, ppm | Weight of Product, g | Residual Vinyl-Acetate (Saponification) % |
|---|---|---|---|
| 2-1 | None[1] | 108.0 | 20.66 |
| 2-2 | " | 103.7 | 19.32 |
| 2-3 | " | 103.0 | 20.34 |
| 2-4 | 1000 | 110 | 29.90 |
| 2-5 | 1000 | 111.3 | 30.64 |
| 2-6 | 1000 | 111.6 | 30.50 |
| 2-7 | 2000 | 115.9 | 32.96 |
| 2-8 | 2000 | 114.1 | 32.51 |
| 2-9 | 2000 | 115.1 | 32.19 |
| 2-10 | 4000 | 116.2 | 33.49 |
| 2-11 | 4000 | 116.9 | 34.21 |
| 2-12 | 4000 | 115.7 | 34.04 |

[1]The water content of the benzene and methanol was checked at intervals during this study and that described in Example 3. Karl Fischer water analyses on the methanol were 287, 295, 310, 306, 307, 269 ppm. On the benzene the results were 65, 66, 79, 65, 69 and 57.

EXAMPLE 3

This example comprises a further careful study of the effect of added water on the alcoholysis of an ethylene-vinyl acetate copolymer, similar to Example 2 but using an ethylene-vinyl acetate copolymer containing less vinyl acetate.

500 ml. of benzene were added from the supply can described in Example 2 to a reaction flask equipped as described therein. The benzene was heated to 75°–80° C and 125.0 g of an ethylene-vinyl acetate copolymer containing 27.8% vinyl acetate by saponification and having a melt flow rate of 2.3 g/10 min. was added thereto over a ½ hour period. After stirring and heating for an additional ½ hour at 75°–80° C to complete dissolution of the copolymer, the solution was cooled to 55°–60° C. Over the next ½ hour a solution made from 160 ml of methanol and a 15 ml aliquot of a sodium methoxide catalyst stock solution (prepared by dissolving 7.986 g of metallic sodium in 400 ml of methanol under nitrogen) was gradually added. All methanol was taken from the supply can of Example 2 and used without drying. The same catalyst stock solution was used in all the experiments of this example. After completing addition of the diluted catalyst solution, the reaction was continued an additional three hours at 58°±1° C and then terminated by addition of 1.0 ml of glacial acetic acid.

In this series of experiments the product is a friable, granular solid. It was isolated by gradually adding over a period of 1 hour 500 ml of ordinary drum grade methanol with stirring at 58°±1° C. After stirring an additional 15 minutes, the slurry was cooled to 30° C, the product collected by filtration, and washed 2 times with alternate 300 ml portions of water and methanol. The product was dried overnight in vacuum at 60° C.

The alcoholysis procedure was repeated two additional times. The same procedure was again repeated three additional times but 0.675 ml of water (1000 ppm added water based on benzene and methanol used in the reaction) was added to the diluted catalyst solution just prior to adding it to the ethylene-vinyl acetate copolymer solution. Additional triplicate experiments were also done in which 2000 ppm of water was added. The results of the entire study are shown in Table 3, the uniformity of the vinyl acetate contents of the alcoholyzed polymers produced at each of the specified water levels being plotted in FIG. 2.

TABLE 3

Alcoholysis of an Ethylene-Vinyl Acetate Copolymer (27.8% Vinyl Acetate) in the presence of Added Water

| Exp. No. | Amount of Added $H_2O$, ppm | Weight of Product, g | Residual Vinyl Acetate (Saponification) % |
|---|---|---|---|
| 3-1 | None[1] | 87.5 | 2.39 |
| 3-2 | " | 98.1 | 2.72 |
| 3-3 | " | 100.1 | 2.58 |
| 3-4 | 1000 | 113.7 | 12.93 |
| 3-5 | 1000 | 112.4 | 12.90 |
| 3-6 | 1000 | 115.4 | 12.86 |
| 3-7 | 2000 | 116.0 | 15.75 |
| 3-8 | 2000 | 115.8 | 15.69 |
| 3-9 | 2000 | 114.4 | 15.52 |

[1]See footnote to Table 2.

EXAMPLE 4

This example illustrates that pelleted ethylene-vinyl acetate copolymers can be alcoholyzed in the solid phase to provide hydrolyzed ethylene-vinyl acetate copolymers of uniform run-to-run residual vinyl acetate content.

The alcoholysis was carried out in methanol in the presence of sodium hydroxide. The methanol employed was not dried prior to use. According to the supplier, the nominal water content is 0.1%. Since the same quality of methanol was used in both experiments of this example, it is apparent that it is not the actual water content which is important for reproducibility of the residual vinyl acetate in the alcoholysis product but the fact that, in accordance herewith, the water level is maintained substantially constant from experiment to experiment.

Into a reaction flask of the type described in Example 1 1600 ml of methanol of 0.1% nominal water content and 28.0 g (0.775 mole) of sodium hydroxide pellets was introduced. The suspension was stirred until the sodium hydroxide had dissolved and the solution was then cooled to 30° C. Thereupon, 1000 g of the ethylene-vinyl acetate copolymer of Example 1 was added in pellet form. The pellet suspension was heated to 45° C over a period of ½ hour and then stirred at 45° C for a period of 4 hours.

The entire reactant was carried out under nitrogen and methyl acetate-methanol azeotrope was not removed during the reaction. The pellets of ethylene-vinyl acetate copolymer under these conditions are converted to pellets of partially-hydrolyzed ethylene-vinyl acetate copolymer, without agglomeration and without discoloration. At the end of the reaction period the medium was decanted and the partially hydrolyzed pellets were washed by adding 90% aqueous methanol and decanting, and finally by refluxing 5 minutes with 2 fresh portions of 90% aqueous methanol. The partially hydrolyzed pellets were dried overnight in vacuum at about 60° C.

A second identical experiment was carried out the following day using the same ethylene-vinyl acetate copolymer and more of the same methanol. The properties of the two partially hydrolyzed ethylene-vinyl acetate products are summarized in Table 4:

TABLE 4

| Exp. No. | Weight of Product | Residual Vinyl Acetate (Saponification) | Melt Flow Rate g/10 Min. | Na+ Residual ppm |
|---|---|---|---|---|
| 4-1 | 902.1 | 23.53 | 7.2 | 320 |
| 4-2 | 897.4 | 23.51 | 8.18 | 310 |

EXAMPLE 5

This example illustrate the alcoholysis of the same pelletized ethylene-vinyl acetate resin used in Example 1, when the degree of hydrolysis of the product is substantially less than that obtained in accordance with Example 4.

In the reactor described in Example 4, 13.1 g (0.327 mole) of sodium hydroxide pellets was dissolved under nitrogen in 1000 ml of drum-grade methanol. To the solution was added 1000 g of the ethylene-vinyl acetate resin of Example 1. The pellet suspension was stirred and heated to 45° C over a period of ½ hour and the reaction continued with stirring and heating under nitrogen for an additional 3 hours. The alcoholysis medium was decanted and replaced with 1500 ml of methanol, which was stirred for 5 minutes and decanted. The latter decantation-washing process was repeated and the pellets were dried in vacuum.

The alcoholysis procedure was repeated in a second experiment, using the same quality of methanol for the alcoholysis medium, except that the final product was first rinsed with 90% aqueous methanol and then washed two more times by heating at 45° C for 15 minutes in 90% aqueous methanol. The pellets were dried in vacuum and were free of any discoloration. They are described further in Table 5 below.

TABLE 5

| Exp. No. | Weight, g | Residual Vinyl Acetate, % (Saponification) | Melt Flow Rate g/10 Min. |
|---|---|---|---|
| 5-1 | 945.0 | 32.79 | 9.6 |
| 5-2 | 938.0 | 30.85 | 8.4 |

EXAMPLE 6

This example illustrates the reproducibility observed in two experiments in which an ethylene-vinyl acetate copolymer containing 52.2% vinyl acetate (by saponification) and having a melt flow rate of 62 g/10 min. was partially alcoholyzed in xylene-methanol solution.

The alcoholysis was carried out in the manner and in the reactor described in Example 1. To 750 ml of xylene dried by passage through activated molecular sieves was added, over ½ hour at 70°–75° C, 375 g of ethylene-vinyl acetate resin. After 15 minutes more stirring and heating, the resin had completely dissolved. The solution was cooled to 55°–60° C and 750 ml of methanol of nominal 0.1% water content was added over ½ hour. This was followed by the addition over a further ½ hour of sodium methoxide catalyst solution made by dissolving 1.81 g of metallic sodium (79 mM of sodium methoxide) in 525 ml of methanol of the same quality.

The reaction was continued for an additional 4 hours at 55°–60° C, and the temperature was raised to reflux. During the next hour 2250 ml of methanol containing 9.3 ml (163 mM) of glacial acetic acid was added at reflux to precipitate the hydrolyzed product. The product was collected by filtration, washed 3 times with water, three times with methanol, and dried in vacuum.

This experiment was repeated; the two colorless, granular products obtained are compared in Table 6:

TABLE 6

| Exp. No. | Weight g | Vinyl Acetate, % (Saponification) | Melt Flow Rate g/10 Min. | Na+ Residual, ppm |
|---|---|---|---|---|
| 6-1 | 256 | 6.9 | 28 | 50 |
| 6-2 | 257 | 8.0 | 29 | 40 |

EXAMPLE 7

This example illustrates the reproducibility obtained in four experiments in which an ethylene-vinyl acetate resin having a melt flow rate of 8.1 g/10 min., and containing 19.8% vinyl acetate by saponification, was partially alcoholyzed in xylene-methanol solution.

The alcoholysis was carried out in the manner and in the reactor described in Example 1. To 1500 ml of xylene dried by passage through activated molecular sieves and heated to 75°–80° C was added, with stirring over ½ hour, 375 g of the resin. After ½ hour additional stirring to complete dissolution of the resin, the solution was cooled to 55°–60° C, and a 60 ml aliquot of a catalyst solution was added over a period of a further ½ hour. The catalyst solution had been made by dissolving 1.92 g of metallic sodium in 100 ml of methanol of nominal 0.1 % water content (50 mM sodium methoxide). The alcoholysis reaction was continued for an additional 3 hours at 55°–60° C, and the product was precipitated at this temperature by adding 1050 ml of methanol containing 2.25 ml (40 mM) glacial acetic acid over a period of 1 hour.

After cooling to 30° C, the slurry of hydrolyzed ethylene-vinyl acetate copolymer was filtered, and the product was washed once with methanol, twice with water, and 3 more times with methanol. The product, after drying in vacuum at about 60° C, was a colorless, granular solid.

The above procedure was duplicated three additional times. The products obtained are described in Table 7:

TABLE 7

| Exp. No. | Weight g | Residual Vinyl Acetate, % (Saponification) | Melt Flow Rate g/10 Min. | Na+ Residual ppm |
|---|---|---|---|---|
| 7-1 | 355.7 | 12.5 | 8.3 | — |
| 7-2 | 354.2 | 12.2 | 10 | 68 |
| 7-3 | 352.4 | 11.5 | 9.6 | 80 |
| 7-4 | 355.5 | 13.0 | 10 | — |

EXAMPLE 8

This example illustrates the partial alcoholysis of an ethylene-vinyl acetate copolymer having a melt flow rate of 8.9, and containing 9.5% vinyl acetate by saponification.

The alcoholysis was carried out in the manner and in the reactor described in Example 1. Into 1500 ml of xylene, dried as described in Example 4 and heated to 50°–55° C, was added with stirring over a period of ½ hour, 285.5 g of the resin. After an additional ½ hour of heating and stirring, the resin had dissolved and the solution was cooled to 70° C. Over the next 10 minutes a 60 ml aliquot of a solution of 1.02 g of sodium hydroxide pellets in 100 ml of methanol of nominal 0.1% water content was added. The reaction was continued for an additional 4 hours at 70° C and, over a period of 1 hour, 1100 ml of methanol containing 1.5 ml of glacial acetic acid was added to precipitate the hydrolyzed ethylene-vinyl acetate copolymer product and destroy the catalyst. The resulting slurry was cooled to 30° C and filtered. The isolated product was washed once with methanol, twice with water, and 3 more times with methanol, and dried in vacuum.

Four additional experiments were conducted in which the procedure and materials used were unchanged. The partially hydrolyzed ethylene-vinyl acetate copolymer products in each case were white powders which are compared in Table 8:

TABLE 8

| Exp. No. | Weight g | Residual Vinyl Acetate, % (Saponification) | Melt Flow Rate g/10 Min. | Na+ Residual, ppm |
|---|---|---|---|---|
| 8-1 | 255.1 | 4.1 | 8.4 | — |
| 8-2 | 340.4[1] | 4.5 | 8.6 | 2 |
| 8-3 | 241.4 | 4.3 | 9.1 | — |
| 8-4 | 338.9[1] | 4.2 | 8.9 | — |
| 8-5 | 240.8 | 4.0 | 8.9 | 1 |

[1]These runs were scaled up by a factor of 33%.

EXAMPLE 9

This example illustrates the more extensive or exhaustive alcoholysis of an ethylene-vinyl acetate copolymer containing 26% vinyl acetate by weight, and having a melt flow rate of 2–3 g/10 min.

A 5-liter, 3-neck glass reaction flask was equipped with a mechanically driven paddle stirrer, reflux condenser, addition funnel, oil heating bath, and nitrogen inlet. The flask was flushed with nitrogen before starting the alcoholysis reaction and a nitrogen atmosphere was maintained therein throughout the reaction.

To the flask was added 1500 ml of xylene dried by passage through activated molecular sieves under nitrogen. After the xylene was heated to 60°–65° C, 375 g of the resin was added slowly with stirring. When the resin had all been added the mixture was heated for 15 minutes longer, when solution was complete. The resin-containing solution was then cooled to 55°–60° C and, over a period of ½ hour, 525 ml of methanol containing 1.67 g of metallic sodium dissolved therein was added (3.9 g, 0.0725 mole of sodium methoxide). The alcoholysis was continued for 3½ to 4 hours longer by stirring and heating at 55°–60° C, whereupon the temperature was increased to reflux and, over a period of 1 hour, 1500 ml of methanol was gradually added at reflux temperature. After an additional 15 minutes at reflux, the fine slurry which had formed was cooled to 30° C and the solid contained therein was collected by filtration. After washing twice with water (250 ml) and twice with methanol (250 ml), the filter cake was dried in vacuum at about 55° C. The product was a white powder, 325.7 g.

When the precipitation step was carried out below the reflux temperature in another experiment, the precipitated product was very gelantinous in nature and considerable difficulty was encountered in removing it from the reactor, in filtration and in washing. When precipitated as noted, however, the product was obtained as a fluid slurry which presented no difficulty in removal, and which was easy to filter and wash. Color in the slurry remained behind in the filtrate.

The above procedure was repeated several times to secure enough material for examination of physical properties (Table 9A). The physical properties of a blend of this hydrolyzed ethylene-vinyl acetate copolymer appear in Table 9B:

TABLE 9A

Exhaustive Alcoholysis of Ethylene/Vinyl Acetate Copolymers

| Copolymer composition: | 26% vinyl acetate |
|---|---|
| Copolymer melt flow rate: | 2 g/10 min. |
| Copolymer $\eta_{inh}$: | 0.67 dl/g /l |
| Copolymer charged: | 375 g |

Hydrolyzed Resin Product

| Exp. No. | g. | $\eta_{inh}$[1] | Residual Vinyl Acetate %[2] | Residual Na+, ppm[4] |
|---|---|---|---|---|
| 9-1 | 218.0[3] | 0.66 | 1.0 ± 0.5 | 106 |
| 9-2 | 325.77 | 0.64 | 1.0 ± 0.5 | 170 |
| 9-3 | 325.3 | 0.65 | 1.0 ± 0.5 | 84 |
| 9-4 | 320.2 | 0.64 | 1.0 ± 0.5 | 95 |

TABLE 9A-continued

| | | | | |
|---|---|---|---|---|
| 9-5 | 325.7 | 0.65 | 1.1 ± 0.5 | 100 |

[1]The inherent viscosity $\eta_{inh}$, of a polymer solution is defined as the natural logarithm of the relative viscosity divided by the concentration in g/deciliter. (W.R. Sorenson and T.W. Campbell, "Preparative Methods of Polymer Chemistry", Inter-Science Publishers, Inc., New York, 1961, p. 35). In these experiments the inherent viscosity was determined on the basis of 0.50 g of the hydrolyzed resin product/100 ml in cyclohexanone at 75° C.
[2]Infrared film analysis, calibrated by saponification.
[3]The charge of reactants in this experiment was reduced by a third.
[4]Atomic absorption analysis.

TABLE 9B

Effect of Exhaustive Hydrolysis on Physical Properties of Ethylene-Vinyl Acetate Copolymers

| Resin | Unhydrolyzed[1] | Hydrolyzed[2] |
|---|---|---|
| Melt flow rate, g/10 min. | 3 | 5.94 |
| Vinyl acetate content, % by weight | 26–28 | 1.0 + 0.5 |
| Density, g/cc | 0.950 | 0.9648 |
| Tensile strength, psi[3] | | |
| At yield, | 480 | 2570 |
| At break, | 1750 | 1980 |
| Elongation, % | 710 | 200 |
| Tensile Modulus of Elasticity, psi[5] | | |
| 1% secant modulus | 2990 | 70,500 |
| 2% secant modulus | — | 58,200 |
| Torsional stiffness, psi | 2500 | 71,900 |
| Flexural stiffness, psi | 1700 | 68,931 |
| Shore D Hardness | 28 | 60 |
| Vicat softening point, ° C, | 47 | 105.0 |
| Low temperature brittleness, F/50, ° C | <−76 | <−76 |
| Stress Crack, F/50, hrs.[4] | — | 1.0 |
| Abrasion Resistance, Taber Weight loss/1000 cycles, g (H-18 wheels, 1000 g) | | 0.0379 |

[1]Typical properties for this resin are given.
[2]Blend of the five substantially fully hydrolyzed resins of Table 9A.
[3]D-412 specimen; 12 in/min. crosshead separation.
[4]Specimens not annealed prior to testing.
[5]ASTM Method D638-67T.

EXAMPLE 10

This example illustrates the exhaustive alcoholysis of an ethylene-vinyl acetate copolymer containing 39% vinyl acetate by weight, and having a melt flow rate of 5.8 g/10 min.

The alcoholysis experiments were carried out in the apparatus and in the manner described in Example 9, except that two liters of methanol was used for precipitation. The results of four identical experiments are shown in Tables 10A and 10B:

TABLE 10A

Exhaustive Alcoholysis of Ethylene-Vinyl Acetate Copolymers

| Copolymer Composition: | 39.1% vinyl acetate by weight |
| Copolymer melt flow rate: | 5.8 g/10 min. |
| Copolymer $\eta_{inh}$: | 0.69 dl/g |
| Copolymer charged: | 375 g |

| | | Hydrolyzed Resin Product | | |
|---|---|---|---|---|
| Exp.No. | g | $\eta_{inh}$[1] | Residual Vinyl Acetate %[2] | Residual Na+ ppm[3] |
| 10-1 | 288.5 | 0.72 | 1.2 ± 0.6 | 70 |
| 10-2 | 282.2 | 0.71 | 1.3 ± 0.8 | 60 |
| 10-3 | 277.4 | 0.73 | 1.3 ± 0.8 | 30 |
| 10-4 | 284.7 | 0.71 | 1.5 ± 0.6 | 50 |

[1]0.500 g/100 ml, cyclohexanone, 75° C.
[2]Infrared film analysis, calibrated by saponification.
[3]Atomic absorption.

TABLE 10B

Effect of Exhaustive Hydrolysis on Physical Properties of Ethylene-Vinyl Acetate Copolymers

| Resin | Unhydrolyzed[1] | Hydrolyzed[2] |
|---|---|---|
| Melt flow rate, g/10 min. | 5–9 | 7.09 |
| Vinyl Acetate content, % by wgt. | 38–41 | 1.3 ± 0.8 |
| Density, g/cc | 0.970 | 0.9876 |
| Tensile Strength, psi[3] | | |
| at yield, | — | 2690 |
| at break, | — | 2680 |
| Elongation, % | — | 460 |
| Tensile Modulus of Elasticity, psi[5] | | |
| 1% secant modulus | 600 | 67,600 |
| 2% secant modulus | — | 59,200 |
| Torsional stiffness, psi | 800 | 82,350 |
| Flexural Stiffness, psi | — | 65,500 |
| Shore D Hardness | 13 | 62 |
| Vicat Softening Point, ° C | 38 | 101.5 |
| Low Temperature Brittleness F/50, ° C | <−76 | <−76 |
| Stress crack, F/50, hrs.[4] | — | 48 |
| Abrasion Resistance, Taber, Weight loss/1000 cycles, g. | — | 0.0418 |

[1]Typical properties for this resin are given.
[2]Blend of the four substantially fully hydrolyzed resins of Table 10A.
[3]D-412 specimen, 12 in/mm crosshead separation.
[4]Specimens not annealed prior to testing.
[5]ASTM Method D638-67T.

EXAMPLE 11

This example illustrates the exhaustive alcoholysis of an ethylene-vinyl acetate copolymer containing 32.4% vinyl acetate by weight (saponification) and having a melt flow rate of 15 g/10 min., to produce a hydrolyzed ethylene-vinyl acetate copolymer in the form of a free-flowing white powder of which 94% is comprised of particles having sizes in the range of from about 75 to 300 microns, a particle size range of interest for powder-coating applications.

Into a 50-gallon stirred water-jacketed autoclave under nitrogen 175 pounds of xylene was introduced, and 45.0 lbs of the above ethylene-vinyl acetate copolymer was thereafter dissolved therein. The resin solution was adjusted to 140° F and a solution of sodium methoxide, made by dissolving 101 g of metallic sodium in 55.5 pounds of methanol under nitrogen, was added over a period of ½ hour at 140° F. The reaction was continued for 3 hours at 146°–152° F with agitation. At this point the hydrolyzed product was precipitated by the gradual addition of 238.0 pounds of methanol containing 363 ml of glacial acetic acid at 148°–154° F over a period of ½ hour.

Refluxing was continued for a further ½ hour period and the contents of the autoclave were agitated overnight without application of heat. The slurry was filtered and the filter cake was washed with methanol and water and dried. The product was 38.0 pounds of a free-flowing powder; residual vinyl acetate, 1.3%; melt flow rate, 30.5 g/10 min., residual sodium ion, 10 ppm. Screen analysis of the powder gave the following results:

TABLE 11

| U.S. Series Sieve No. (Range) | Micron, Designation | Percent larger |
|---|---|---|
| + 50 | +297 | 2.2 |
| +100, −50 | +149, −297 | 52.6 |
| +140, −100 | +105, −149 | 29.1 |
| +200, −140 | + 74, −105 | 12.1 |
| −200 | − 74 | 4.0 |

EXAMPLE 12

This example illustrates the partial alcoholysis of an ethylene-vinyl acetate copolymer containing 44.3% vinyl acetate by weight and having a melt flow rate of 31 g/10 min., wherein the partially hydrolyzed copolymer product is isolated as a rubbery crumb by the successive steps of (1) washing the finished reaction mixture with water to remove unused alcohol, methyl acetate, and catalyst residues, (2) removing benzene solvent by steam distillation, in the presence of a nonionic surface active agent, and (3) cooling the aqueous dispersion of the hydrolyzed copolymer crumb until it can be filtered without coagulation.

In a 2-liter glass reaction flask under nitrogen 125 g of the above copolymer was subjected to alcoholysis in a mixture of 500 ml of benzene and 125 ml of ethanol, both solvents having previously been dried by passage through activated molecular sieves under nitrogen. The 125 ml of ethanol contained sodium ethoxide catalyst, made in situ by dissolving therein 0.13 g of metallic sodium (5.6 mM, 0.30 g of sodium ethoxide), which was added over a period of 25 minutes to the copolymer dissolved in the benzene at 62° C. The reaction mixture was agitated at 58°–60° C for an additional 5 hours and then 4.0 ml (70 mM) of glacial acetic acid was added to destroy the catalyst.

To the reaction mixture was added 300 ml of water. An emulsion formed did not break on standing overnight. To 600 ml (547 g) of this emulsion was then added 600 ml of additional water. The organic and aqueous layers then separated cleanly. The organic layer was again washed with water and from it 66 g samples were taken for crumbing experiments.

Each crumbing experiment was carried out gradually adding the 66 g portion of the washed organic layer containing the hydrolyzed ethylene-vinyl acetate copolymer to 500 ml of boiling water in a steam distillation apparatus into which steam was simultaneously introduced. In each of the experiments a different amount of surface active agent was previously added to the water to promote crumb formation.

The results of the experiments show that the addition of about 0.07% by weight of Pluronic F-98, a polyalkyleneoxide-type nonionic surfactant, is desirable to provide good crumbing of the hydrolyzed ethylene-vinyl acetate copolymer product. Also it is preferable to cool the aqueous dispersion of the crumb prior to filtration to avoid agglomeration on the filter.

TABLE 12

| Exp. No. | Concentration of Pluronic F-98 in Water, %[1] | Nature of Precipitated Product |
|---|---|---|
| 12-1 | 0.007 | no foam; product coagulates |
| 12-2 | 0.014 | " |
| 12-3 | 0.023 | foaming; some crumb forms, but product coagulates |
| 12-4 | 0.07 | foaming; product forms crumbs, but agglomerated on filter when filtered hot (>50° C) |
| 12-5 | 0.07 | foaming; product forms crumb; crumb collected by filtration after cooling (>50° C) |

[1] A nonionic surfactant comprising a block copolymer containing ethylene oxide and propylene oxide repeating units, commercially available from Wyandotte Chemicals corp.

EXAMPLE 13

This example illustrates the partial alcoholysis of an ethylene-vinyl acetate copolymer containing 44.3% vinyl acetate by weight and having a melt flow rate of 31 g/10 min., wherein the partially hydrolyzed copolymer product is isolated as a rubbery crumb by the successive steps of (1) cautiously contacting the finished alcoholysis reaction mixture with precipitant alcohol under conditions of minimum or no agitation, (2) allowing the mixture thus obtained to remain in contact without applied agitation for periods of 10–20 minutes, and (3) finally applying agitation to precipitate the hydrolyzed ethylene-vinyl acetate copolymer product as a rubbery crumb.

In a 2-liter glass reaction flask under nitrogen 125 g of the above copolymer was subjected to alcoholysis in a mixture of 500 ml of xylene and 175 ml of a methanolic sodium methoxide catalyst solution. The 175 ml of methanolic catalyst solution had been made up by dissolving 0.574 g of metallic sodium in 175 ml of methanol, withdrawing 18 ml thereof (2.6 mM sodium methoxide) and diluting it with 157 ml of fresh methanol. The resulting catalyst solution was added to the reaction over 30 minutes at 55°14 – C. The reaction mixture was agitated at 55°–60° C for an additional 3.5 hours and then 0.2 ml (3.3 mM) of glacial acetic contained was added to destroy the catalyst.

To 800 ml of methanol in a 2-liter flask equipped with a stirrer was cautiously added 400 ml of the finished reaction solution. The contents of the flask were allowed to stand in contact for 10 minutes without stirring. Stirring was then initiated and the hydrolyzed ethylene-vinyl acetate copolymer product separated as very small chunks which did not stick to the agitator blade. The product was recovered by filtration, washed with methanol and dried at 40° C in vacuum. The granular crumb form was retained. The final product contaied 29.0% residual vinyl acetate by saponification and had a melt flow rate of 34.7 g/10 min. When the finished reaction solution was merely poured into excess methanol with immediate agitation, the polymeric product separated as a solid mass which stuck to the stirrer blade and could not be broken up into a crumb.

EXAMPLE 14

This example illustrates the effect of sodium methoxide catalyst concentration on the course of the alcoholysis of an ethylene-vinyl acetate copolymer containing 39.1% by weight of vinyl acetate (saponification) and having a melt flow rate of 5.8 g/10 min., in which the amount of methanol used for the alcoholysis is about equal to the stoichiometric amount required for the degree of alcoholysis desired.

In this example and in Example 15 the benzene and methanol supplies used in the alcoholysis reaction contained 254 and 245 ppm of water, respectively, by Karl Fisher Analysis, and were stored in closed metal container under nitrogen to insure that the water level remained relatively constant from run-to-run. The water analyses were 215 and 607 ppm in the respective reagents after completion of the experiments of this example and Example 15.

Into a 2-liter, 3-neck glass reaction flask fitted with mechanical stirrer, thermometer, reflux condenser, dropping funnel, and heating bath was introduced under nitrogen 300 ml of benzene, whereupon 125 g of the ethylene-vinyl acetate copolymer was added and dissolved with heating and stirring at 75°–80° C. Thereupon, at 75° C a solution of 100 ml additional benzene and 11.2 ml of sodium methoxide catalyst solution was added over a period of 25 seconds. The catalyst solution had been prepared by dissolving and reacting 1.39 g of freshly cut metallic sodium in 56.8 ml of methanol (0.375 mole methanol, 0.0125 mole sodium methoxide).

The reaction was continued with heating and stirring at 68°–72° C for a total period of two hours. The reaction medium became yellow and somewhat less viscous after the catalyst solution was added. The reaction was terminated by adding 1.1 ml of glacial acetic acid to destroy the catalyst and the liquid reaction mixture was cooled to room temperature and bottled.

The above procedure was repeated two additional times to provide a set of triplicate reproducibility experiments.

In a second series of three experiments the above procedure was again repeated, except that 11.2 ml of the methanolic sodium methoxide catalyst solution, which had been prepared from 3.61 g of sodium and 56.8 ml of methanol (0.262 mole methanol, 0.33 mole sodium methoxide) was used. In these alcoholyses the solution became exceedingly viscous after addition of the catalyst and the increased viscosity disappeared only after adding 2.9 ml of glacial acetic acid to terminate the reaction after the two hour reaction period.

Each of the finished alcoholysis reaction products was weighed and one-half of the total amount was withdrawn and diluted with about one-half of its volume of additional benzene. The resulting diluted solution was then steam-distilled by adding it gradually to about one liter of water through which live steam was passed. Before starting, 0.72 g of Pluronic F-98 was added to the water to favor the separation of the hydrolyzed ethylene-vinyl acetate copolymer product as a rubbery crumb.

From each of the six finished alcoholysis solutions the hydrolyzed ethylene-vinyl acetate copolymer produced was recovered as an off-white, rubbery crumb, which was washed with water and dried in vacuum at 45° C. The characterization of these products appears in the following table.

vinyl acetate versus catalyst concentration for the above data, from which it is apparent that the residual vinyl acetate content of the product varies with catalyst concentration at the lower catalyst level, but not at the higher catalyst level.

It is also evident from the above table that the melt flow rates of the three polymers obtained at the higher catalyst level are lower than those observed for the polymers at the lower catalyst level. All of the polymers are soluble in toluene and are accordingly not cross-linked.

EXAMPLE 15

This example illustrated the effect of reaction time on the course of alcoholysis of an ethylene-vinyl acetate copolymer containing 40.8% by weight of vinyl acetate and having a melt flow rate of 6.8 g/10 min. The ratio of sodium methoxide catalyst to methanol present during alcoholysis is essentially that of the last three experiments of Example 14, but the total amount of benzene solvent was increased until the initial copolymer solids content was reduced from about 25 to about 15% to facilitate stirring, handling, and steam distillation and isolation of product.

Essentially in the manner and in the apparatus described in Example 14, 125 g of the ethylene-vinyl acetate resin (40.8% vinyl acetate content, MFR = 6.8) was dissolved in 600 ml. of benzene from the same supply used in Example 14. To this solution at 75° C was rapidly added a mixture of 100 ml of the same benzene and a 13.4 ml aliquot of a sodium methoxide solution prepared by dissolving and reacting 3.61 g of metallic sodium in 56.8 ml of the methanol from the supply described in Example 14 (0.310 mole methanol, 0.039 mole of sodium methoxide). The reaction was continued with heating and stirring at 68°–70° C for a total period of two hours, whereupon it was terminated by rapidly adding 2.9 g of glacial acetic acid. The polymeric product was isolated by steam distillation as described in Example 14.

The above procedure was repeated three additional times but the alcoholysis reaction time was held in the separate experiments at 40, 20 and 5 minutes. The results obtained are shown in Table 14:

TABLE 13

| | | | PRODUCT | | | | |
|---|---|---|---|---|---|---|---|
| | | | | | Vinyl Acetate Content | | |
| Exp. No. | Methanol,[4] mole | NaOCH$_3$[4] mole[3] | Amount, g[1] | Yield %[2] | Calc. | Found[3] | MFR g/10 Min. |
| 14-1 | 0.275 | 0.0125 | Not detd. | — | 22.3 | 25.4 | 10.0 |
| 14-2 | " | " | 100.2 | 93.6 | " | 23.7 | 5.4 |
| 14-3 | " | " | 103.0 | 91 | " | 24.3 | 5.45 |
| 14-4 | 0.262 | 0.033 | 91.0 | 78.5 | 23.0 | 23.0 | 0.23 |
| 14-5 | " | " | 101.2 | 88 | " | 23.3 | 0.72 |
| 14-6 | " | " | 106.0 | 91.5 | " | 23.2 | 0.85 |

[1]Twice the weight of product isolated.
[2]Lower yields probably reflected surface losses incurred in handling viscous solutions.
[3]Saponification.
[4]A curve was established which relates density of sodium methoxide solutions to grams of sodium dissolved per milliliter of methanol used to make them. Assuming quantitative reaction of sodium and methanol, derived plots were constructed which give mM of methanol and sodium methoxide contained per ml of solution as a function of grams of sodium dissolved per ml of methanol used to make the solution.

Examination of the data in the preceding table reveals that the alcoholysis of this particular ethylene-vinyl acetate copolymer became truly stoichiometric, with extended run-to-run reproducibility in residual vinyl acetate content, only at the higher catalyst level. This can best be appreciated from a plot of residual

TABLE 14

| Exp. No. | Reaction Time Min. | Amount g[1] | Yield, % | Residual Vinyl Acetate % Calc.[2] | Residual Vinyl Acetate % Found[3] | MFR g/10 Min. |
|---|---|---|---|---|---|---|
| 15-1 | 120 | 113 | 101 | 21.7 | 21.5 | 4.86 |
| 15-2 | 40 | 105 | 94.5 | " | 21.4 | 4.39 |
| 15-3 | 20 | 103 | 92.5 | " | 21.3 | 7.30 |
| 15-4 | 5 | 116 | 103 | " | 21.8[4] | 9.1 |

[1]Calculated from amount of product isolated by steam distillation of an aliquot of reaction product.
[2]Several pounds of the ethylene-vinyl acetate copolymer were taken from a 1000 lb. supply box and kept in the laboratory in a polyethylene bag. Toward the end of this study the laboratory sample contained 40.8% vinyl acetate by saponification; a portion removed from the laboratory supply and dried overnight in vacuum (~5mm) at 45° C showed no appreciable weight loss and contained 41.4% vinyl acetate. Several subsequent samples taken from the large supply box contained around 42.5% vinyl acetate; apparently these differences reflect heterogeneity in the ethylene-vinyl acetate resin. The value of 40.8% is used in the calculation.
[3]Saponification.
[4]Benzene of same grade from a new supply can used; 327 ppm water.

The results indicated in the table show that (a) reducing the resin concentration during alcoholysis from 25% solids (Exps. 14-4, -5 and -6) to 15% solids, as above, increases the melt flow rate from 0.2–0.9 to 4.86; (b) the alcoholysis reaction, when carried out with substantially stoichiometric amounts of alcohol is remarkably fast and is complete in 5 minutes and perhaps in an even shorter time; and (c) the melt flow rate falls as the reaction time is increased.

EXAMPLE 16

This example provides further evidence that the constancy of water content of the reaction medium, run after run, rather than the absolute water content of the medium per se, is significant in controlling the degree of partial alcoholysis and/or saponification of an ethylene-vinyl acetate copolymer in the present process. In the experiments summarized herein the water content of the medium was fixed at 1.25, 2 and 4 weight percent by adding appropriate amounts of water, with due consideration for the residual water contents of the toluene solvent and methanol used, as well as that of the copolymer.

Sufficient supplies of toluene and methanol were maintained in 5-gallon metals cans under nitrogen and used in all the experiments described in this example. The residual water levels of these solvents were established by Karl Fischer Analysis before, during and upon terminating the set of experiments. The toluene contained 278 ppm of water and the methanol contained 643-666 ppm of water.

Triplicate reactions were carried out at each of the three water levels selected. In each experiment the added water was introduced into the methanolic solution of sodium methoxide just prior to its addition to the toluene solution of the ethylene-vinyl acetate copolymer resin.

Into a 2-liter, 3-necked glass reaction flask equipped with a mechanically driven paddle stirrer, reflux condenser, thermometer, additional funnel and oil heating bath, and provided with a nitrogen atmosphere throughout, was introduced 500 ml. of toluene, transferred from the supply can by means of a hypodermic syringe. The toluene was heated to 80°–90° C, and 125 g of pellets of an ethylene-vinyl acetate copolymer containing 27.7 weight percent (melt index, 3 g/10 min.) was added and dissolved by heating at 80°–90° C and stirring over a period of 45 minutes. In the addition funnel under nitrogen was placed 160 ml of methanol followed by 15 ml of a methanolic solution of sodium methoxide stock solution prepared by dissolving 11.98 g of metallic sodium in 200 ml of methanol. The same sodium methoxide stock solution was used in all the experiments described in this example.

The required amount of water was added to the diluted sodium methoxide solution in the addition funnel and the resulting solution was added to the stirred resin solution over a period of 10 minutes at 60° C. The reaction mixture thus formed was cloudy and milky, and resembled a latex. The reaction was continued with stirring at 60°±1° C for a total of three hours, after which it was terminated by the addition of 3.0 ml of glacial acetic acid. Thereafter 500 ml of methanol was added over 50 minutes at 60° C to precipitate the product. Upon cooling to 40°–43° C the precipitated mass broke up into granules and fine particles. After cooling to about 30° C the slurry formed was collected by filtration, washed twice with 200 ml portions of water, and twice with 200 ml portions of methanol. The washed product was dried in vacuum overnight at 50° C. Substantially the entire amount of each product was then milled on a small two-roll rubber mill for 10 minutes at about 150° C to ensure homogeneity. The residual vinyl acetate content of each milled sample was determined by saponification; the data thus obtained are set forth in Table 15, the uniformity of the vinyl acetate contents of the alcoholyzed polymers produced at each water level being plotted in FIG. 3.

TABLE 15

Hydrolysis of an Ethylene-Vinyl Acetate Copolymer (27.7% Vinyl Acetate) in the Presence of Up to About 4% of Added Water

| Exp. No. | Amount of Added $H_2O$ %[1] | Weight of Product, g. | Residual Vinyl Acetate Saponification,%[2] |
|---|---|---|---|
| 16-1 | 1.25 | 117.7 | 19.51 |
| 16-2 | 1.25 | 118.5 | 19.68 |
| 16-3 | 1.25 | 118.7 | 19.29 |
| 16-4 | 1.97 | 118.9 | 21.59 |
| 16-5 | 1.97 | 120.0 | 21.38 |
| 16-6 | 1.97 | 120.9 | 22.16 |
| 16-7 | 3.90 | 121.9 | 24.18 |
| 16-8 | 3.90 | 121.9 | 24.30 |
| 16-9 | 3.90 | 122.1 | 23.98 |

[1]The water content of the toluene and methanol in the supply can was checked at intervals during this study. Karl Fischer water analyses on the toluene were 278, 278 ppm. On the methanol the results were 657, 666, 643 ppm. The copolymer contained 720 ppm by weight of water.
[2]Substantially the entire precipitated alcoholyzed copolymer was homogenized prior to saponification by milling on a two-roll mill for 10 minutes at about 150° C.

EXAMPLE 17

This example illustrates the exhaustive alcoholysis in solution of a terpolymer of ethylene, vinyl acetate and sulfur dioxide that contains 7.8 weight percent vinyl acetate and 1.68 weight percent sulfur dioxide, the remainder of the terpolymer consisting of terpolymerized ethylene units. The terpolymer had a melt index of 1.17 g/10 min.

In a 2-liter, 3-necked glass reaction flask equipped with a mechanically driven paddle-stirrer, reflux condenser, thermometer, addition funnel and heating bath, and provided with a nitrogen atmosphere, was placed 500 ml of toluene (278 ppm $H_2O$). The toluene was heated to 90° C and 90 g of the above terpolymer was dissolved in it over a period of 1 hour. The pale yellow solution obtained was cooled to 70° C, and to it was added over 10 minutes a solution of 18.0 ml of methanol (657 ppm $H_2O$) and a 2.0 ml aliquot of a sodium methoxide solution prepared by dissolving 12.0 g of metallic sodium in 200 ml of methanol (643 ppm $H_2O$) under nitrogen.

The alcoholysis was conducted for three hours at 70° C, whereupon it was terminated by adding 0.5 ml of glacial acetic acid. Thereafter 370 ml of methanol was added over 1 hour at reflux (63° C) to precipitate the product. The slurry was cooled to 30° C and filtered. The product was washed 2 times with methanol to yield a white powder, which after drying overnight, amounted to 82.9 g.

The dried white powder contained 1.31% residual vinyl acetate by saponification, 1.60% sulfur dioxide, and had a melt index of 2.18 g/10 min. The melting point of the terpolymer by differential thermal analysis was 100° C before alcoholysis and 111° C after alcoholysis. The infrared spectrum of both the original and the alcoholyzed terpolymer indicated the presence of a sulfone linkage of the sulfur dioxide units.

EXAMPLE 18

This example illustrates the use of linear, branched, or cycloaliphatic hydrocarbons as the hydrocarbon solvent employed, as well as higher alcohols, e.g., ethanol or n-propanol. Table 16 summarizes the several experiments, which were all carried out in the manner set forth in Example 1, except that the water contents of the hydrocarbon solvent and the alcohol in the supply containers were established by Karl Fischer water analysis before proceeding with the alcoholysis reaction.

In all but the final experiment in Table 16, the ethylene-vinyl acetate copolymer subjected to alcoholysis contained about 26–28 weight percent vinyl acetate, and the alcoholysis conditions were selected to produce a product containing about 10–15 weight percent residual vinyl acetate. It will be observed that in the various solvent combinations employed, i.e., n-heptane/ethanol, isooctane/methanol, cyclohexane/methanol, and cyclohexane/ethanol, fairly similar degrees of alcoholysis were achieved provided with water levels did not differ greatly, despite the variation in the choice of hydrocarbon solvent and alcohol. Example 18-1 indicates that the results found in the above solvent systems resemble those obtained in the commonly used toluene/methanol system.

The scatter in residual vinyl acetate level of the products is admittedly wider than that observed in the benzene/methanol solvent system at a more constant water level, i.e., as in Examples 2 and 3. In the present case, of course, the observed scatter may not only reflect the wider variations in water level but also the differences in nature of the hydrocarbon solvents and alcohols. Very clearly, ordinary 95% ethanol is not equivalent to absolute alcohol containing only 207 ppm of water; substantially no alcoholysis is observed in cyclohexane/95% ethanol whereas a product containing about 14 weight percent residual vinyl acetate is obtained when absolute ethanol is substituted (Examples 18-2, -5, -6).

It should also be pointed out that the cyclohexane-methanol system forms two liquid phases, up to the alcoholysis reaction temperature, yet despite this unusual feature, about the same amount of alcoholysis is obtained as in the homogeneous or one liquid phase systems.

The final experiment (Example 18-7) represents the exhaustive alcoholysis of an ethylene-vinyl acetate copolymer originally containing about 60 weight percent vinyl acetate, in cyclohexane-n-propanol, using sodium propoxide as catalyst.

TABLE 16

Solution Alcoholysis of Ethylene Vinyl-Acetate Copolymers
in Mixtures of Various Hydrocarbons and Alcohols
Ethylene-Vinyl Acetate Resin Charge: 125 g per Experiment

| | Ethylene-Vinyl Acetate Resin | | Solvent Mixture | | | | | |
|---|---|---|---|---|---|---|---|---|
| | | | Hydrocarbon | | | Alcohol | | |
| Exp. No. | Wt. % VA[1] | MI g/10 min.[2] | Name | Amt. ml. | $H_2O$ Content ppm[5] | Formula | Amt. ml. | $H_2O$ Content ppm[5] |
| 18-1 | 27.90 | 3[4] | Toluene | 425 | 227 | $CH_3OH$ | 85 | 698 |
| 18-2 | 26.07 | '' | n-heptane | 420 | 60 | $C_2H_5OH$ | 123 | 207 |
| 18-3 | 26.07 | '' | isooctane | 420 | 58 | $CH_3OH$ | 85 | 638 |
| 18-4 | 26.07 | '' | cyclohexane | 412 | 340 | $CH_3OH$ | 85 | 782 |
| 18-5 | 27.7 | '' | '' | 650 | 72 | $C_2H_5OH$ | 123 | 207 |
| 18-6 | 26.07 | '' | '' | 420 | 35 | 95% $C_2H_5OH$ | 127 | 9.8 wt. % |
| 18-7 | 60.67 | 2.33[3] | '' | 400 | 79 | $n-C_3H_7OH$ | 187 | 1323 |

| Exp. No. | No. of Liquid Phases[6] | Catalyst Formula | Amt. g. | Reaction Time Hrs. | Temp., °C. | Product Amt. g. | Residual Ethylene-Vinyl Acetate Wt.%[1] | MI g/10 min.[2] |
|---|---|---|---|---|---|---|---|---|
| 18-1 | 1 | NaOH | 1.10 | 2 | 65 | 109.1 | 10.72 | 4–6[7] |
| 18-2 | 1 | '' | 1.1 | 2 | 71.2 | Not Det'd. | 14.26 | 5.3 |
| 18-3 | 1 | '' | '' | 2 | 58 | '' | 14.32 | Not Det'd. |
| 18-4 | 2 | '' | '' | 2 | 70 | 120 | 11.64 | '' |
| 18-5 | 1 | '' | '' | 2 | 65–6 | Not Det'd. | 13.69 | '' |
| 18-6 | 1[9] | '' | '' | 2 | 63.5–5 | 113.5 | 25.15 | '' |

TABLE 16-continued

| 18-7 | 1 | n-C$_3$H$_7$ONa | 8.9 | 2 | 55-76 | Not Det'd.[8] | 4.68 | " |

[1]Saponification
[2]ASTM Method D-1328-65T, Condition E (190° C., 2160 g. load)
[3]ASTM Method D-1238-65T, Condition B (125° C., 2160 g. load)
[4]MI specification for this commercial resin
[5]Karl Fischer water analysis on solvent in supply cans.
[6]At room temperature and reflux.
[7]Range of typical MI's for this partially alcoholyzed resin made in this solvent-alcohol combination.
[8]Product separates during alcoholysis.
[9]One phase at reflux, two phases at room temperature.

EXAMPLE 19

This example illustrates the acid-catalyzed alcoholysis of an ethylene-vinyl acetate containing 26.07 weight percent vinyl acetate in solution in toluene and methanol. Thus, into a 2-liter, 3-necked flask equipped with a reflux condenser, thermometer, mechanical stirrer, oil heating bath, and provided with a nitrogen atmosphere, was placed 430 ml of toluene (226 ppm H$_2$O). The toluene was heated and 125 g of the ethylene-vinyl acetate resin was dissolved therein. Thereupon, a solution of 1.0 ml of concentrated sulfuric acid dissolved in 85 ml of methanol (321 ppm H$_2$O) was added over 10 minutes and the reaction was continued at 60°-62° C for 8 hours. Hourly samples were removed and treated with 90% aqueous methanol containing 2.5% concentrated NH$_4$OH to quench the reaction. The samples were then refluxed with 60% aqueous methanol to remove ammonium sulfate, washed with methanol, and dried.

The progress of the alcoholysis is indicated in the following table. The residual vinyl acetate contents of the purified samples were obtained by infrared methods calibrated by saponification.

| Reaction Time, Hours | Residual Vinyl Acetate, Wt.% |
|---|---|
| 0 | |
| 1 | 26.18 |
| 2 | 22.33 |
| 3 | 21.53 |
| 4 | 18.84 |
| 5 | 17.77 |
| 6 | 15.71 |
| 7 | 13.38 |
| 8 | 13.20 |

Alcoholyzed copolymers prepared by acid catalysis with sulfuric acid contained small amounts of sulfur and tended to have abnormally low melt indices.

EXAMPLE 20

Examples 2, 3 and 16 illustrate the effect of increasing amounts of water on the alcoholysis of two representative ethylene-vinyl acetate copolymers when the catalyst utilized in the alcoholysis reaction is sodium methoxide in methanol, prepared by dissolving metallic sodium in methanol. In the following example sodium hydroxide was added to catalyze the alcoholysis. The ethylene-vinyl acetate copolymer employed was substantially the same as that used in Example 3, and contained 27.0 weight percent vinyl acetate by saponification.

In carrying out the set of experiments described hereinafter, the procedure employed and the precautions observed were essentially the same as those already described in detail in Examples 2, 3 and 16. Karl Fischer water analysis showed that the initial water content of the toluene, the methanol, and the ethylene-vinyl acetate resin were 265, 726 and 840 ppm. From these values the total initial water content of the toluene, methanol, and copolymer was calculated to be 0.0641 weight percent, based on the total weight of the solvents and copolymer. Triplicate alcoholysis reactions were then performed, using 125 g of copolymer, 425 ml of the aforesaid toluene, and 85 ml of the aforesaid methanol in which 1.25 g of sodium hydroxide had been dissolved. The alcoholysis reactions were continued for a total of 3 hours at reflux whereupon 2.6 ml of glacial acetic acid was added, followed by 350 ml of methanol at reflux for precipitation. Upon cooling to about room temperature, the resulting slurry was filtered and the partially hydrolyzed product isolated was thereafter washed once with a 100 ml portion of methanol and dried in vacuum overnight at about 50° C. The residual vinyl acetate contents of the dry, colorless granular product was determined by saponification.

Triplicate alcoholysis experiments were then carried out at total initial water levels of 0.229, 0,280, and 0.331 weight percent, based on the total weight of toluene, methanol, and copolymers charged, by adding the appropriate amount of water to the methanolic solution of the sodium hydroxide catalyst. These further experiments were otherwise identical in every respect to the initial three experiments with no added water. Table 17 summarizes the details of the aforesaid set of experiments at different total initial water levels. FIG. 4, Curve A, is a graphical representation of the results of these laboratory experiments.

These selected operating conditions have been substantially followed in an extensive series of batch alcoholysis reactions on a pilot plant scale in a stirred autoclave of 100-gallon capacity, in which a similar ethylene-vinyl acetate copolymer was employed (27.9% vinyl acetate). These runs are summarized in Table 18. The water content of each drum of benzene and methanol used in the series of runs was determined by Karl Fischer analysis. The solvents were then pumped into the reactor and the reactions were carried out under dry nitrogen.

It should be understood that the nature of such operations may well tend to produce larger fluctuations in the actual water content of the two solvents and in operating conditions than is the case in careful laboratory studies. Nevertheless, the results obtained generally conform with the laboratory results of FIG. 4, as shown by Curve B.

Curve B is the best straight line fit of the data of Table 18 as determined by polynomial regression with the aid of a computer.

TABLE 17

| Exp. No. | Total Initial Amount of Water, Wt.% | Weight of Product, g.[1] | Residual Vinyl Acetate Content of Product, wt.%[2] |
|---|---|---|---|
| 20-1 | 0.0641 | 113.8 | 10.58 |
| 20-2 | 0.0641 | 112.1 | 10.37 |
| 20-3 | 0.0641 | 111.7 | 10.62 |
| 20-4 | 0.229 | 117.2 | 16.17 |
| 20-5 | 0.229 | 116.9 | 16.71 |
| 20-6 | 0.229 | 116.6 | 16.36 |
| 20-7 | 0.280 | 118.2 | 17.41 |
| 20-8 | 0.280 | 117.6 | 17.31 |
| 20-9 | 0.280 | 117.6 | 17.44 |
| 20-10 | 0.331 | 116.4 | 17.86 |
| 20-11 | 0.331 | 117.5 | 18.01 |
| 20-12 | 0.331 | 117.6 | 17.79 |

[1] Recovered from 125 g. of ethylene-vinyl acetate copolymer
[2] Saponification

TABLE 18

Control of Partial Alcoholysis of Ethylene-Vinyl Acetate on a Pilot Plant Scale

Ethylene-Vinyl Acetate Resin: 27.9 Weight Percent Vinyl Acetate[1]
Reaction Conditions: 2 Hours at Reflux (135–138° F) under Nitrogen

| | | Alcoholysis Reaction | | | | | | Product | | | |
|---|---|---|---|---|---|---|---|---|---|---|---|
| | | Benzene | | Methanol | | Total | | | | | |
| Exp. No. | Resin Lbs. | Lbs. | $H_2O$ ppm[2] | Lbs. | $H_2O$ ppm[2] | $H_2O$ ppm[2,3] | NaOH q. | $CH_3COOH$[4] Glacial ml. | Lbs. | Residual Vinyl Acetate[1]% | MI g/10 Min. | $Na^+$ ppm[5] |
| 20-13 | 75 | 266 | 503 | 40 | 228 | 463 | 300 | 650 | 67.0 | 12.70 | 4.77 | — |
| 20-14 | 75 | 226 | 466 | 40 | 228 | 426 | 300 | 650 | 66.0 | 12.37 | 4.58 | — |
| 20-15 | 75 | 226 | 399 | 40 | 209 | 368 | 300 | 650 | 65.0 | 11.43 | 4.59 | — |
| 20-16 | 74 | 226 | 399 | 40 | 209 | 368 | 300 | 650 | 62.0 | 12.68 | 4.28 | — |
| 20-17 | 75 | 226 | 373 | 40 | 530 | 398 | 300 | 650 | 57.0 | 12.69 | 4.35 | — |
| 20-18 | 75 | 226 | 394 | 40 | 173 | 357 | 300 | 650 | 66.0 | 13.70 | 4.70 | — |
| 20-19 | 75 | 226 | 780 | 40 | 255 | 692 | 300 | 650 | 63.0 | 12.7 | 5.1 | 70 |
| 20-20 | 85 | 256 | 780 | 45 | 255 | 693 | 340 | 750 | 73.0 | 14.5 | 4.7 | 300 |
| 20-21 | 85 | 256 | 524 | 45 | 244 | 479 | 340 | 750 | 73.0 | 10.6 | 4.4 | 320 |
| 20-22 | 85 | 256 | 558 | 45 | 455 | 541 | 340 | 750 | 76.0 | 13.1 | 4.8 | 98 |

[1] Saponification
[2] Karl Fischer water analysis.
[3] Calculated, ppm $H_2O$ on weight volume basis
[4] Added to neutralize NaOH
[5] Atomic absorption.

EXAMPLE 21

This example illustrates the exhaustive alcoholysis of an ethylene vinyl acetate copolymer containing 60.8 weight percent vinyl acetate and having a melt flow rate of 5.6 g/10 min. (Condition A), wherein the original ethylene-vinyl acetate resin is dissolved in toluene-methanol prior to alcoholysis instead of toluene alone, and the alcoholyzed product is recovered by precipitation at reflux with 83 weight percent aqueous methanol instead of pure methanol.

Thus, in a 100-gallon stirred reactor, 50.0 pounds of the aforesaid ethylene-vinyl acetate copolymer was dissolved in a mixture of 104 pounds of toluene and 32 pounds of methanol by heating and stirring overnight at reflux under nitrogen. A solution of sodium methoxide was prepared by dissolving one pound of metallic sodium in 32 pounds of methanol under nitrogen. The resulting sodium methoxide was added to the resin solution at reflux over a period of 15 minutes. The water content of the toluene and methanol was not determined, but the quality of the two solvents used was comparable to that of the solvents employed in Example 20 (Table 18).

The reaction was terminated by adding 1350 ml of glacial acetic acid. Thereafter, a mixture of 162 pounds of methanol and 36 pounds of water (83 weight percent aqueous methanol) was added over 20 minutes at reflux, the reactor contents were cooled to 90° F, and 240 pounds of additional water was added. The resulting slurry was filtered, covered with methanol, washed with water several times, and finally with methanol, and then dried.

Two additional substantially identical alcoholysis runs were then made in order to obtain sufficient resin for evaluation. The three products are characterized in Table 20.

TABLE 19

Alcoholysis of an Ethylene-Vinyl Acetate Copolymer Containing 60.8 Weight Percent Vinyl Acetate Amount of Copolymer Charged: 50.0 Lbs.

| | Product | | | |
|---|---|---|---|---|
| Exp. No. | Amount Recovered Lbs. | Residual Vinyl Acetate, %[1] | Hydroxyl Percent | Melt Flow Rate g/10 Min. (Cond. D) |
| 21-1 | 32.0 | 3.96 | 13.44 | 101 |
| 21-2 | 35.0 | 3.95 | 14.06 | 102 |
| 21-3 | 34.0 | 3.48 | 14.09 | 103 |

[1] Saponification.

EXAMPLE 22

This example illustrates the partial alcoholysis, on a pilot plant scale, of an ethylene-vinyl acetate copolymer containing 66.0–68.6 weight percent of vinyl acetate, to produce a product containing about 10–11 weight percent residual vinyl acetate, employing a modified precipitation technique in which the precipitant is a mixture of methanol and acetone.

Thus, in a 100-gallon stirred reactor in a manner essentially equivalent to that described in Example 20, the aforesaid resin was subjected to alcoholysis in benzene-methanol, employing sodium methoxide as catalyst. In the initial experiment, the ethylene-vinyl acetate resin (50 pounds, 66.0% vinyl acetate) was dissolved by heating at reflux overnight in a mixture of 106 pounds of benzene and 32 pounds of methanol. The water content of the benzene and methanol was not determined, but the quality of these two solvents used was comparable to that of the solvents employed in Example 20. The resin solution was then adjusted to 140° F, whereupon, over a period of 15 minutes, a sodium methoxide solution, which had been prepared by dissolving 145 g of metallic sodium in an additional 32 pounds of methanol, was added.

The alcoholysis was continued for two hours at reflux and 1.25 pounds of glacial acetic acid was added to terminate the reaction. The product was precipitated by first adding over a 30-minute period at reflux a solution of 155 pounds of acetone and 67 pounds of methanol, and then cooling the solution to room temperature over one hour to complete the precipitation. The slurry was filtered and the product was washed with a solution prepared by mixing 35 pounds of acetone and 15 pounds of methanol. Upon drying, at 100°–110° F in vacuum, 32 pounds of product was obtained containing 10.5 weight percent residual vinyl acetate (melt index 11.8 g/10 min.).

In a second experiment, 55 pounds of resin (30 pounds containing 66.0% vinyl acetate, 25 pounds containing 68.6% vinyl acetate) was dissolved in 117 pounds of benzene and 35 pounds of methanol. The sodium methoxide catalyst was prepared by dissolving 160 g of metallic sodium in 35 pounds of methanol. The reaction was conducted at 140° F for 2 hours, when it was terminated by adding 1.50 pounds of glacial acetic acid. The product was precipitated by added a solution of 170 pounds of acetone and 73 pounds of methanol over 30 minutes and cooling to room temperature. After filtration, washing with a solution of 138 pounds of acetone and 50 pounds of methanol, and drying in vacuum at 110° F, the product (33 pounds) contained 11.28 weight percent residual vinyl acetate and had an MI of 11.2 g/10 min.

EXAMPLE 23

This example illustrates the exhaustive alcoholysis of an ethylene-vinyl acetate copolymer initially containing 80 weight percent vinyl acetate, in which the alcoholysis reaction is carried out in solution in methanol alone in the presence of a sodium methoxide catalyst, and in which the alcoholyzed product is recovered by precipitation with water being used as the precipitant.

Substantially as described in Example 1, in successive laboratory alcoholysis experiments 375 g specimens of an ethylene-vinyl acetate copolymer containing 80 weight percent vinyl acetate were each dissolved in 600 ml portions of methanol of reagent quality from a single supplier. The water content was not determined, but the supplier specified a water content of 0.1%. A solution of sodium methoxide prepared by dissolving 8.75 g of metallic sodium in 580 ml of the methanol was then added to each methanolic resin solution at 55°–60° C over a period of 30 minutes. The reactions were continued for 4.2–4.5 hours and, over a period of one hour, 3600 ml of water was added to each reaction mixture, the mixture was stirred for 15 minutes and finally cooled to 30°–33° C. The products were recovered by filtration, washed 5 times each with 400 ml portions of water, and dried overnight in vacuum at 55° C. The products are described in Table 20.

TABLE 20

Alcoholysis of a Ethylene-Vinyl Acetate Copolymer Containing 80 Weight Percent Vinyl Acetate in Methanol Solution Amount of Copolymer Charged: 375 g

| Exp. No. | Product | | | |
|---|---|---|---|---|
| | Amount Recovered, g | Residual Vinyl Acetate, %[1] | Na$^+$, ppm[2] | Appearance |
| 23-1 | 207.4 | 3.2 | 2900 | Yellow, solid |
| 23-2 | 208.2 | 4.0 | 4100 | Yellow, solid |
| 23-3 | 211.0 | 2.9 | 4000 | Yellow, solid |
| 23-4 | 211.2 | 3.3 | 4500 | Yellow, solid |
| 23-5 | 211.0 | 4.1 | 2900 | Yellow, solid |

[1]Infrared analysis calibrated by saponification.
[2]Atomic absorption.

EXAMPLE 24

This example provides evidence that in the alcoholysis and/or saponification of an ethylene-vinyl acetate copolymer containing as much as 60.6 weight percent of VA, it is again the constancy of the total amount of water admitted to the reaction, including the residual water content of the solvents and any amount of water deliberately added, that principally controls the degree of hydrolysis under otherwise identical conditions. In the experiments summarized herein, the total water content level was calculated from the initial water contents of the toluene and methanol to be used in each experiment plus any water to be deliberately added. The total water content level is expressed in percent by weight of the total weight of toluene and methanol used in a given experiment. The water content of the ethylene-vinyl acetate copolymer was neglected in this example; it is believed to be very low and, more importantly, would be constant since the same lot of copolymer was used throughout.

Sufficient supplies of toluene and methanol were maintained in five-gallon cans under nitrogen and used in all the experiments described in this example. The residual water levels of these solvents were established by Karl Fischer Analysis before, during, and upon terminating the set of experiments. The initial analyses of the toluene and methanol showed the presence of 224 and 582 ppm of water, respectively, and these values were used to calculate the total water content of these two solvents. The subsequent water analyses gave 111 and 111 ppm of water in the toluene, and 640 and 718 ppm in the methanol, indicating no appreciable change relative to the set of experiments reported here. The calculated initial water level of the toluene and methanol used for each reaction was 0.036 weight percent, based on the weight of the solvents. Duplicate alcoholysis reactions were carried out in these solvents without added water. Thereafter, water was deliberately added to achieve total initial water levels of 0.275, 0.336, 0.50, 0.75 and 1.25 weight percent, based on the total weight of toluene and methanol. Duplicate alcoholysis reactions were then carried out at each successive water level, under otherwise identical conditions, except at the highest level where triplicate reactions were performed. The procedure followed is indicated below.

Into a 2-liter, 3-necked glass reaction flask equipped with a mechanically driven paddle stirrer, reflux condenser, thermometer, additional funnel, oil heating bath, and provided with a nitrogen atmosphere throughout, was introduced 300 ml of the aforesaid toluene and 100 ml of the aforesaid methanol, transferred by means of a hypodermic syringe. The toluene-methanol solution was heated to 65° C (reflux) and 125 g of the aforesaid ethylene-vinyl acetate copolymer containing 60.6 weight percent of vinyl acetate (melt flow rate 2.3 g/10 min., Condition B, ASTM D-1238) was added and dissolved by heating at 65° C (reflux) with stirring over a period of 75 minutes. In the additional funnel under nitrogen was placed 100 ml of a methanolic solution of sodium hydroxide prepared by dissolving 6.750 g of sodium hydroxide in 450 ml of the aforesaid methanol. The same sodium hydroxide stock solution was sufficient for four experiments; thereafter, new sodium hydroxide stock solutions were prepared as needed.

When water was added, it was introduced into the sodium hydroxide catalyst solution in the addition funnel and the resulting solution was then allowed to flow into the stirred resin solution over a period of 10 minutes at 65° C. The reaction mixture thus formed was clear and essentially colorless. The reaction was continued with stirring at 65° C for a total of 2 hours, after which 7.5 ml of glacial acetic acid was added. Thereafter, a mixture of 510 ml methanol and 90 ml water was added over 40 minutes at 65° C (reflux). The mixture thus formed was clear to milky and resembled a latex, particularly in the experiments containing water levels of 0.75 percent or higher. Upon cooling to 10°–12° C, the product precipitated as granules or separated as a viscous phase. Thereupon, 600 ml of water was added over 15 minutes to further precipitate and separate the product. The separated product was filtered and washed twice with 200 ml portions of water. The washed product was dried in vacuum overnight at 50° C. Substantially the entire amount of each product was milled on a small two-roll rubber mill for 10 minutes at about 150° C to insure homogeneity of composition. The residual vinyl acetate content of each milled sample was determined by saponification; the data thus obtained are set forth in Table 21. The residual vinyl acetate contents of the alcoholyzed polymers produced at each water level are plotted in FIG. 5 against total water level as defined above.

TABLE 21

Alcoholysis of an Ethylene-Vinyl Acetate Copolymer Containing 60.6 Weight Percent VA. Effect of Total Water Admitted to the Alcoholysis Reaction on the Degree of Alcoholysis

| Exp. No. | Total Amt. of $H_2O$, % | Weight of Product g.[1] | Residual Vinyl Acetate, %[2] | $Na^+$ Wt.%,[3] |
|---|---|---|---|---|
| 24-1 | 0.036 | 88.8 | 3.59 | 0.07 |
| 24-2 | 0.036 | 90.2 | 3.74 | — |
| 24-3 | 0.275 | 93.0 | 12.45 | 0.021 |
| 24-4 | 0.275 | 93.1 | 14.17 | 0.17 |
| 24-5 | 0.336 | 93.9 | 14.63 | 0.17 |
| 24-6 | 0.336 | 93.6 | 18.01 | 0.06 |
| 24-7 | 0.500 | 97.5 | 22.92 | — |
| 24-8 | 0.500 | 97.2 | 23.61 | 0.22 |
| 24-9 | 0.750 | 98.7 | 27.24 | — |
| 24-10 | 0.750 | 100.6 | 27.31 | 0.35 |
| 24-11 | 1.25 | 105.0 | 35.01 | 0.31 |
| 24-12 | 1.25 | 101.1 | 31.76 | 0.50 |
| 24-13 | 1.25 | 102.9 | 31.89 | 0.47 |

[1]From 125 g. of ethylene-vinyl acetate copolymer.
[2]Saponification.
[3]Atomic absorption.

It will be understood that various changes may be made in the specific parameters of the preferred embodiments of the controlled alcoholysis process described hereinabove without departing from the scope of the present invention. Accordingly, it is intended that the preceding description should be construed as illustrative and not in a limiting sense.

We claim:

1. In a process for the alcoholysis of an ethylene-vinyl ester interpolymer in a reaction medium comprising as components thereof said polymer, a low-boiling alcohol, a hydrocarbon solvent in an amount up to 1,000 parts by weight per part of the alcohol and an alkaline or acidic catalyst, wherein the aggregate initial amount of water contained in the polymer, the alcohol, the hydrocarbon solvent and the catalyst prior to the alcoholysis reaction is no more than 10% of the total weight thereof; the improvement comprising regulating the aggregate water content of said components introduced into a single alcoholysis reaction and into successive, otherwise identical alcoholysis reaction runs as not to vary by more than 50% by weight of said aggregate water content thereof, maintaining the reaction medium throughout the reaction and throughout successive reaction runs under a dry, inert atmosphere and otherwise carrying out the alcoholysis under conditions preventing the addition or loss of substantial quantities of water to or from said medium, to obtain a partially hydrolyzed polymer having a predetermined residual vinyl ester content.

2. The process of claim 1, wherein the ethylene-vinyl acetate interpolymer alcoholyzed contains from 3 to 57 mole percent of the vinyl ester, the balance of the interpolymer substantially comprising ethylene units.

3. The process of claim 1, wherein the ethylene-vinyl ester interpolymer alcoholyzed contains from 3 to 30 mole percent of the vinyl ester, and the aggregate initial water content of the components of the reaction medium, of any incremental portions of said components introduced during the reaction, and of the components introduced in successive reaction runs, is so regulated as not to vary by more than 20% of the initial water content thereof.

4. The process of claim 1, in which the partially hydrolyzed interpolymer is extracted with water to remove said low-boiling alcohol, the ester by-product of said alcohol, and catalyst residues; and is thereafter steam distilled in the presence of a surfactant to remove hydrocarbon solvent to produce an aqueous suspension of the partially hydrolyzed interpolymer in particulate form.

5. The process of claim 4, wherein the surfactant is a non-ionic ethylene oxide/propylene oxide block copolymer.

6. The process of claim 1, in which the partially hydrolyzed interpolymer is extracted with water to remove said low-boiling alcohol, the ester by-product of said alcohol, and catalyst residues; and is thereafter evaporated to produce the desired partially hydrolyzed interpolymer.

7. The process of claim 1, in which the partially hydrolyzed interpolymer is recovered by contacting the reaction mixture with an additional amount of said low-boiling alcohol under non-turbulent conditions, permitting the mixture to stand without applied agitation for a predetermined period, and thereafter agitating the mixture to precipitate the partially hydrolyzed produced as a rubbery crumb.

8. The process of claim 1, in which the partially hydrolyzed interpolymer contains less than 25% by weight of residual ester and in which the partially hydrolyzed product is recovered by adding an additional amount of said low-boiling alcohol to the reaction mixture at reflux, the product precipitating in finely divided particulate form.

9. The process of claim 1, in which the ethylene-vinyl acetate resin to be hydrolyzed contains more than 60% by weight of vinyl acetate and in which the partially hydrolyzed product is recovered by adding an additional amount of said low-boiling alcohol in admixture with water to the reaction mixture at reflux, cooling the reaction mixture and adding additional water, the product precipitating in finely divided particulate form.

10. The process of claim 1, in which the ethylene-vinyl acetate resin to be hydrolyzed contains more than 60% by weight of vinyl acetate and in which the partially hydrolyzed product is recovered by adding an additional amount of said low-boiling alcohol in admixture with acetone to the reaction mixture to precipitate the product in finely divided particulate form.

11. The process of claim 1, in which the hydrocarbon solvent is a linear or branched paraffin, a cycloaliphatic hydrocarbon, or an aromatic hydrocarbon; the low-boiling alcohol is a monohydric alcohol having from one to four carbon atoms; and the catalyst is an alkali metal or alkaline earth metal alkoxide whose alkanolic moiety corresponds to that of said low-boiling alcohol, an alkali metal or alkaline earth metal hydroxide; or a strong mineral or organic acid.

12. The process of claim 1, wherein the ethylene-vinyl ester interpolymer: catalyst weight ratio varies from 10,000:1 to 1:1, the hydrocarbon solvent: low-boiling alcohol weight ratio varies from 1:50 to 1000:1, the weight ratio of said interpolymer to the liquid mixture of said hydrocarbon solvent and low-boiling alcohol varies from 1:1000 to 100:1.

13. A process for the alcoholysis of an ethylene-vinyl ester interpolymer containing at least 20% of the vinyl ester, which comprises:
   a. reacting the interpolymer with a low-boiling alcohol in the proportion of from 100 to 150 percent of the molar quantity of said alcohol required for stoichiometric hydrolysis of the ester groups to be converted to hydroxyl groups on said interpolymer;
   b. introducing the reactants into a reaction zone in admixture with a hydrocarbon solvent in the proportion to said alcohol of from 1:50 to 1000:1 parts by weight, an alkaline or acidic catalyst in a molar ratio of from 1:20 to 1:5 parts per part of the alcohol, and water, the aggregate amount of water initially present in the components of the resulting reaction mixture being up to 5% by weight thereof;
   c. regulating the water content of the alcohol and hydrocarbon solvent introduced into said reaction medium throughout the reaction and throughout successive reaction runs as not to vary by more than 50% of the initial water content thereof; and
   d. maintaining the reaction medium in a dry, inert atmosphere;
   to thereby obtain a partially hydrolyzed ethylene-vinyl ester interpolymer having a predetermined residual vinyl ester content.

14. In a process for the alcoholysis of an ethylene-vinyl acetate copolymer containing at least 20% vinyl acetate in the presence of an alkaline or acidic catalyst and in a liquid reaction medium comprising a low-boiling alcohol and a hydrocarbon solvent in an amount of from 0 up to 1000 parts by weight per part of the alcohol, wherein the total initial water content of the alcohol, hydrocarbon solvent, copolymer and catalyst introduced is no more than 5% by weight thereof, the improvement comprising:
   a. regulating the aggregate water content of the alcohol and hydrocarbon solvent introduced throughout the reaction and throughout successive idential reaction runs within 20% of the aggregate initial water content thereof;
   b. maintaining the amount of the low-boiling alcohol in the reaction medium at 100–110% of the molar quantity required for stoichiometric hydrolysis of the acetate groups on said copolymer; and
   c. maintaining the reaction medium in a dry, inert atmosphere;
   to thereby obtain a partially hydrolyzed ethylene-vinyl acetate copolymer having a predetermined residual vinyl acetate content.

15. The process of claim 14, in which the hydrocarbon solvent is a linear or branched paraffin, a cycloaliphatic hydrocarbon, or an aromatic hydrocarbon; the low-boiling alcohol is a monohydric alcohol having from one to four carbon atoms; and the catalyst is an alkali metal or alkaline earth metal alkoxide whose alkanolic moiety corresponds to that of said low-boiling alcohol, an alkali metal or alkaline earth metal hydroxide, or a strong mineral or organic acid.

16. The process of claim 14, wherein the ethylene-vinyl ester interpolymer: catalyst weight ratio varies from 10,000:1 to 1:1, the hydrocarbon solvent: low-boiling alcohol weight ratio varies from 1:50 to 1000:1, the weight ratio of said interpolymer to the liquid mixture of said hydrocarbon solvent and low-boiling alcohol varies from 1:1000 to 100:1, and the total initial water level of the components of the reaction mixture varies from 0.005% to 0.5% by weight thereof.

* * * * *